(12) United States Patent
Araki et al.

(10) Patent No.: US 8,450,590 B2
(45) Date of Patent: May 28, 2013

(54) REPRODUCING APPARATUS, RECORDING MEDIUM, REPRODUCING METHOD, AND REPRODUCING PROGRAM

(75) Inventors: Satoshi Araki, Kanagawa (JP); Susumu Ijichi, Kanagawa (JP); Ryo Mukaiyama, Tokyo (JP); Akihiko Nakatani, Kanagawa (JP)

(73) Assignee: Sony Corporation, Tokyo (JP)

( * ) Notice: Subject to any disclaimer, the term of this patent is extended or adjusted under 35 U.S.C. 154(b) by 839 days.

(21) Appl. No.: 11/774,776

(22) Filed: Jul. 9, 2007

(65) Prior Publication Data

US 2008/0019240 A1 Jan. 24, 2008

(30) Foreign Application Priority Data

Jul. 21, 2006 (JP) ................................ 2006-200042

(51) Int. Cl.
G10H 1/02 (2006.01)
(52) U.S. Cl.
USPC ................... 84/609; 84/615; 84/627; 84/634
(58) Field of Classification Search
USPC .......................................................... 84/609
See application file for complete search history.

(56) References Cited

U.S. PATENT DOCUMENTS

| | | | | |
|---|---|---|---|---|
| 6,388,961 B1 * | 5/2002 | Ijichi | ............................ | 369/30.36 |
| 6,542,445 B2 * | 4/2003 | Ijichi et al. | ................. | 369/30.08 |
| 2002/0045960 A1 * | 4/2002 | Phillips et al. | ................... | 700/94 |
| 2004/0264715 A1 * | 12/2004 | Lu et al. | ......................... | 381/119 |
| 2005/0108319 A1 | 5/2005 | Kohno et al. | | |
| 2005/0241465 A1 * | 11/2005 | Goto | .............................. | 84/616 |

FOREIGN PATENT DOCUMENTS

| | | |
|---|---|---|
| JP | A 7-176175 | 7/1995 |
| JP | A 9-298728 | 11/1997 |
| JP | A 2001-94635 | 4/2001 |
| JP | 2003-162285 | 6/2003 |
| JP | A 2003-302987 | 10/2003 |
| JP | A 2005-129110 | 5/2005 |
| JP | A 2005-202319 | 7/2005 |

OTHER PUBLICATIONS

U.S. Appl. No. 11/780,276, filed Jul. 19, 2007, Ijichi, et al.
U.S. Appl. No. 11/778,920, filed Jul. 17, 2007, Ijichi, et al.
U.S. Appl. No. 12/841,753, filed Jul. 22, 2010, Ijichi.

* cited by examiner

Primary Examiner — Elvin G Enad
Assistant Examiner — Christopher Uhlir
(74) Attorney, Agent, or Firm — Oblon, Spivak, McClelland, Maier & Neustadt, L.L.P.

(57) ABSTRACT

Disclosed herein is a reproducing apparatus for continuously reading and reproducing a plurality of content data items from a content data storage unit which stores the plurality of content data items and a plurality of specific position information items representative of specific positions each corresponding to a specific portion of each of the content data items. The reproducing apparatus includes: an input unit; a reproduction unit; and a control unit.

15 Claims, 25 Drawing Sheets

FIG.11

|  | MUSIC DATA CHANGING METHODS | | | |
|---|---|---|---|---|
|  | FIRST | SECOND | THIRD | FOURTH |
| DISPLAY INFORMATION CHANGING METHODS — FIRST | A | B | C | D |
| SECOND | E | F | G | H |
| THIRD | I | J | K | L |
| FOURTH | M | N | O | P |
| FIFTH | Q | R | S | T |

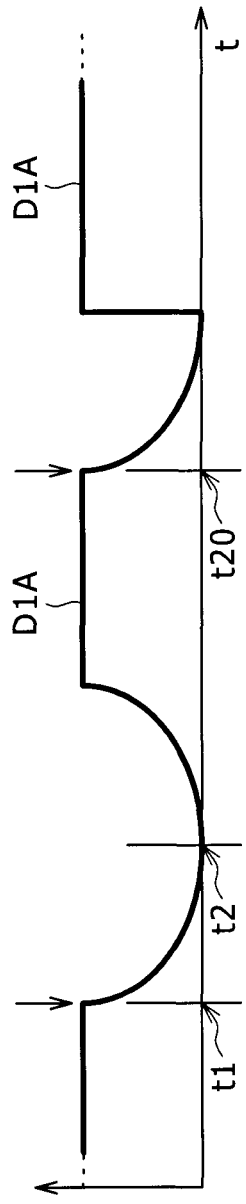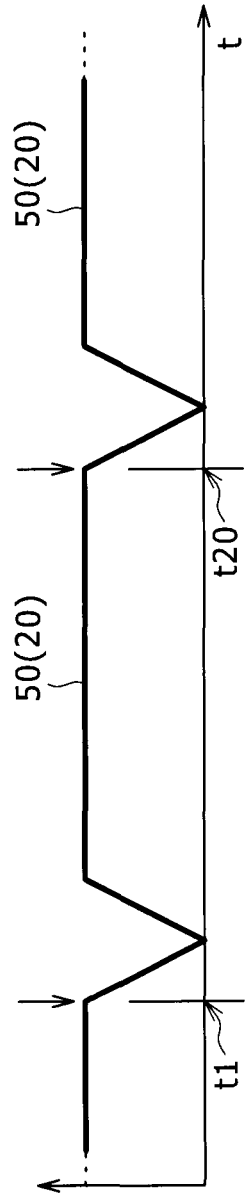
FIG. 13A
FIG. 13B

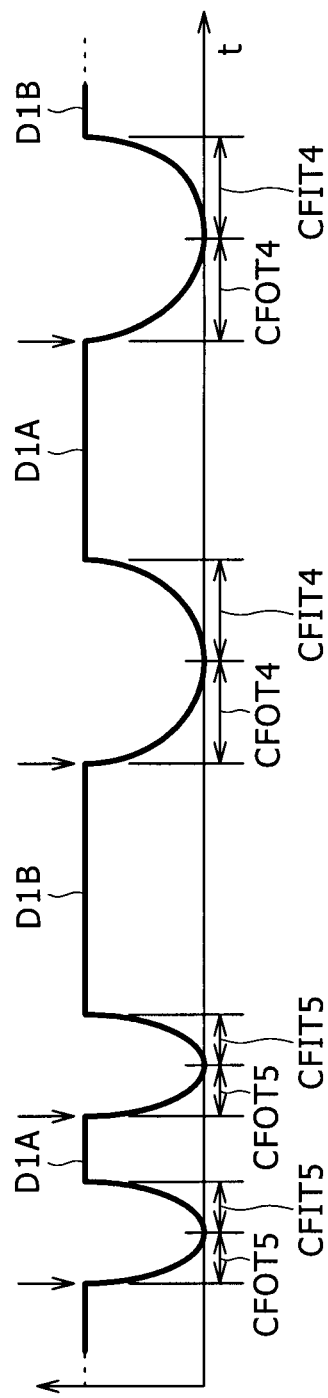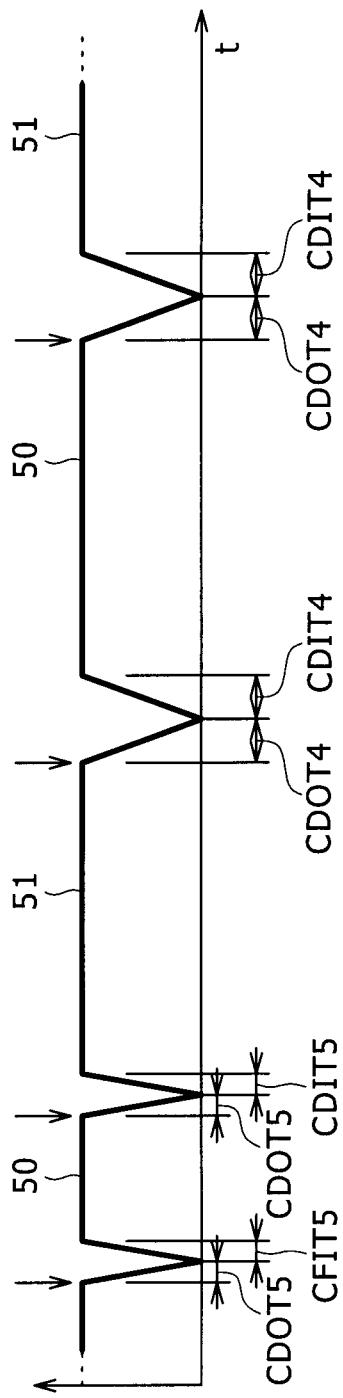
FIG. 17A
FIG. 17B

REPRODUCING APPARATUS, RECORDING MEDIUM, REPRODUCING METHOD, AND REPRODUCING PROGRAM

CROSS REFERENCES TO RELATED APPLICATIONS

The present invention contains subject matter related to Japanese Patent Application JP 2006-200042 filed with the Japan Patent Office on Jul. 21, 2006, the entire contents of which being incorporated herein by reference.

BACKGROUND OF THE INVENTION

1. Field of the Invention

The present invention relates to a reproducing apparatus, a recording medium, a reproducing method, and a reproducing program. More particularly, the invention relates to a reproducing apparatus for reproducing music data according to play lists that define the sequences in which to reproduce music data items as content data.

2. Description of the Related Art

Typical reproducing apparatuses hold play lists in which a plurality of music data items are registered. When a user selects one of the multiple music data items from one of the play lists for a preview, the user's reproducing apparatus may request the selected music data item from a server. The server may retain a plurality of preview music data items each being a specific part extracted from the music data item in question. When the server is requested by the reproducing apparatus to provide the music data item of interest for a preview according to the play list, the server returns to the reproducing apparatus a preview music data item corresponding to the requested music data item.

That is, the server is requested by the user's reproducing apparatus to provide the music data item selected for a preview. In turn, the server sends back the preview music data item. The returned preview music data item is received and reproduced by the reproducing apparatus. After reproduction of the preview music data item is terminated, the reproducing apparatus automatically requests the server to provide the next music data item for a preview in keeping with the play list. In response to the request, the server allows the reproducing apparatus to acquire and reproduce the preview music data item corresponding to the next music data item. In this manner, the reproducing apparatus typically enables the user continuously to preview a plurality of music data items in accordance with the play list.

If the reproducing apparatus is instructed to reproduce in its entirety the original music data item corresponding to the currently previewed music data item, the reproducing apparatus requests the server to provide the original music data item as instructed. In response to that request, the server returns the original music data item to the reproducing apparatus. The reproducing apparatus receives the returned music data item from the server and starts reproducing the received music data item as a whole. In this manner, given an instruction to reproduce the original music data item during its preview, the reproducing apparatus allows the entire music data item to be reproduced (for example, see Japanese Patent Laid-open No. 2003-162285, pp. 22-23).

SUMMARY OF THE INVENTION

One disadvantage of the above-described type of reproducing apparatus is this: during reproduction of a preview music data item corresponding to the user-selected music data item, it may be requested that the next music data item be reproduced in its entirety following the current reproduction of the preview music data item. That request cannot be fulfilled: to reproduce the next music data item as a whole requires giving an additional instruction to do so during reproduction of a preview music data corresponding to the next music data item, following the current reproduction of the preview music data item. The reproducing apparatus needs to be instructed by the user to reproduce the next music data item in its entirety halfway into reproduction of a preview music data item corresponding to that next music data item. This drawback has hampered the user from readily enjoying the next music data item as a whole following the ongoing preview of the current music data item.

The present invention has been made in view of the above circumstances and provides a reproducing apparatus, a recording medium, a reproducing method, and a reproducing program for enabling the user easily to enjoy the next content in its entirety following partial reproduction of the current content.

In carrying out the present invention and according to one embodiment thereof, there is provided a reproducing apparatus for continuously reading and reproducing a plurality of content data items from a content data storage unit which stores the plurality of content data items and a plurality of specific position information items representative of specific positions each corresponding to a specific portion of each of the content data items, the reproducing apparatus including: an input unit; a reproduction unit configured to reproduce the content data items; and a control unit configured to cause the reproduction unit, if a predetermined instruction is input through the input unit, to start reproducing one of the content data items from the specific position of the one content data item in accordance with one of the specific position information items which corresponds to the one content data item, the control unit being further configured to cause the reproduction unit to start reproducing the next content data item from a starting position of the next content data item when the current reproduction of the one content data item is terminated.

The reproducing apparatus embodying the present invention as outlined above shifts from partial reproduction of a given content data item starting from its specific position, to full reproduction of the next content data item smoothly and automatically with no additional instruction needed to reproduce the next content in its entirety.

According to the inventive reproducing apparatus outlined above, an instruction is first input through the input unit to reproduce a given content data item. In response, the control unit controls the reproduction unit to start reproducing the content data item from its specific position based on the specific position information item corresponding to the content data item in question. When the reproduction of the content data item is terminated, the control unit controls the reproduction unit to start reproducing the next content data item from its starting position. With no additional instruction issued to reproduce the next content data item as a whole, the reproducing apparatus effects smooth transition from partial reproduction of a given content data item to full reproduction of the next content data item. In this manner, the present invention provides a reproducing apparatus, a recording medium, a reproducing method, and a reproducing program for allowing a user easily to enjoy the next content data item in its entirety following partial reproduction of the current content data item.

BRIEF DESCRIPTION OF THE DRAWINGS

FIG. 11 is a tabular view explanatory of typical combinations of music data changing methods with display information changing methods;

FIGS. 13A and 13B are schematic views explanatory of how music data is reproduced and display information is changed upon selection of music data;

FIGS. 17A and 17B are schematic views explanatory of how music data and display information changeovers are controlled in keeping with the intervals at which a reproduced music changeover request is input;

DETAILED DESCRIPTION OF THE PREFERRED EMBODIMENTS

Preferred embodiments of the present invention will now be described with reference to the accompanying drawings.

Figure 1:
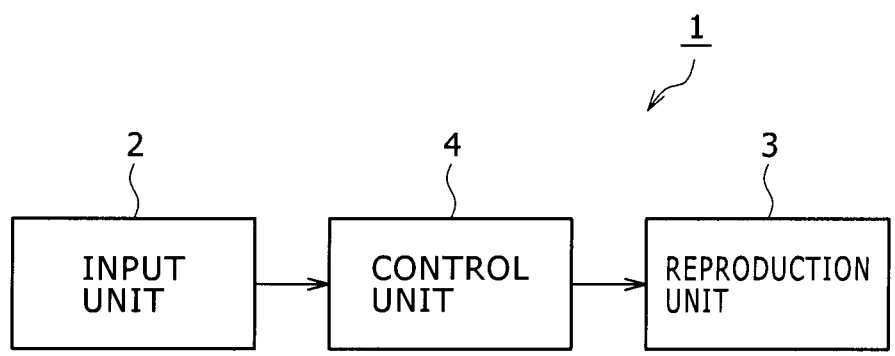
FIG. 1 is a block diagram outlining a reproducing apparatus practiced as a first embodiment of the present invention.

(1) First Embodiment (1-1) Outlined of the Reproducing Apparatus as the First Embodiment In FIG. 1, reference numeral 1 indicates an overall structure of a reproducing apparatus practiced as the first embodiment of the present invention. The reproducing apparatus 1 is arranged to read and reproduce continuously a plurality of content data items from a content data storage unit, not shown, which stores the multiple content data items and a plurality of specific position information items representative of specific positions each corresponding to a specific portion of each of the content data items. As part of the reproducing apparatus 1, an input unit 2 is used to input instructions for content data reproduction. A reproduction unit 3, another part of the reproducing apparatus 1, reproduces content data. A control unit 4 is yet another part of the reproducing apparatus 1. When a reproduction instruction is input through the input unit 2, the control unit 4 controls the reproduction unit 3 to start reproducing a given content data item from its specific position based on the specific position information item corresponding to the content data item in question. At the end of the reproduction of the content data item, the control unit 4 controls the reproduction unit 3 to start reproducing the next content data item from its starting position. With this structure, the reproducing apparatus 1 permits smooth transition from partial reproduction of the current content data item starting from its specific position to full reproduction of the next content data item without requiring additional instructions. The user of the reproducing apparatus 1 is thus allowed easily to enjoy reproduction of the next content data item in its entirety following partial reproduction of the current content data item.

(1-2) Detailed Structure of the Reproducing Apparatus as the First Embodiment

Figure 2:
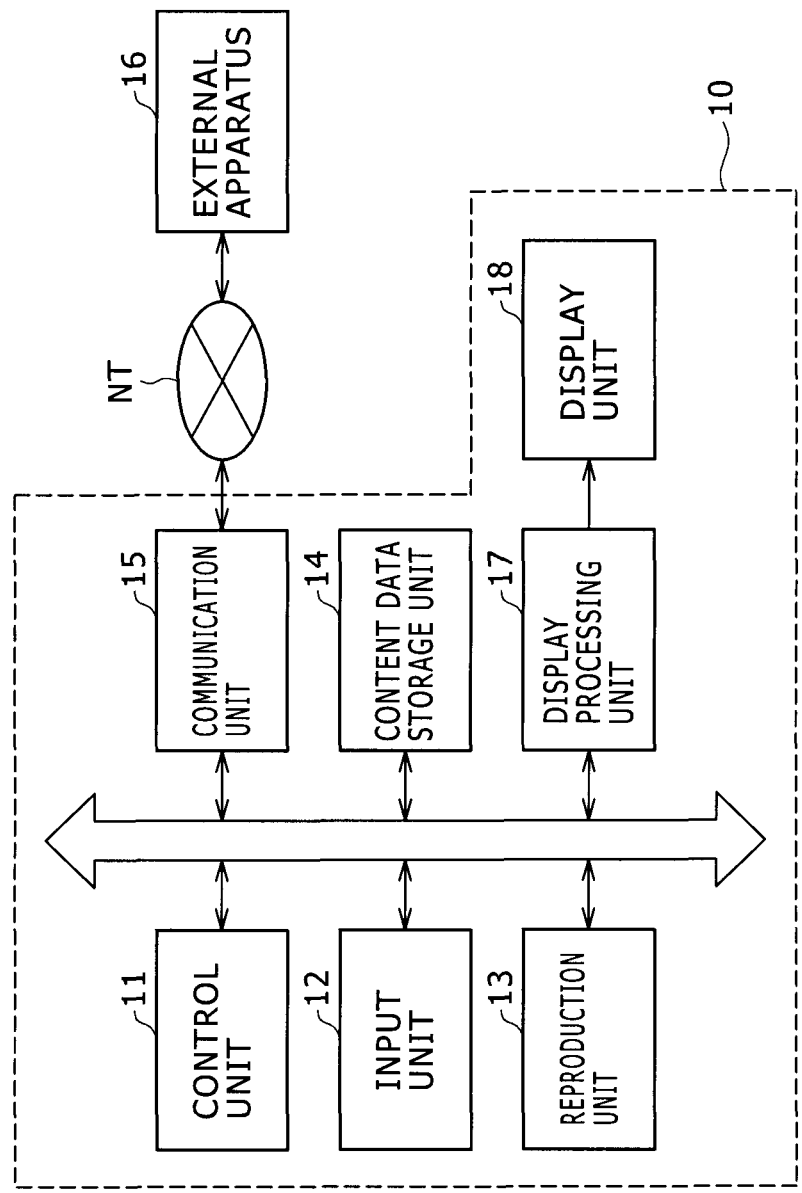
FIG. 2 is a block diagram showing a detailed structure of the reproducing apparatus as the first embodiment.

Described below in reference to FIG. 2 is a detailed hardware structure of a reproducing apparatus 10 made up of functional circuit blocks. With the reproducing apparatus 10, a control unit 11 controls the apparatus as a whole and carries out various processes in response to instructions input through an input unit 12. In so doing, the control unit 11 implements diverse functions including the function of reproducing music data from recording media (medium reproduction function) such as CD (Compact Disc), the function of recording music data retrieved from the recording media (recording function), and the function of reproducing music data using play lists (list-using reproduction function). It is to be noted that the terms music data and music track appearing in the description have the same meanings as commonly used audio data and audio track, respectively.

Figure 3:
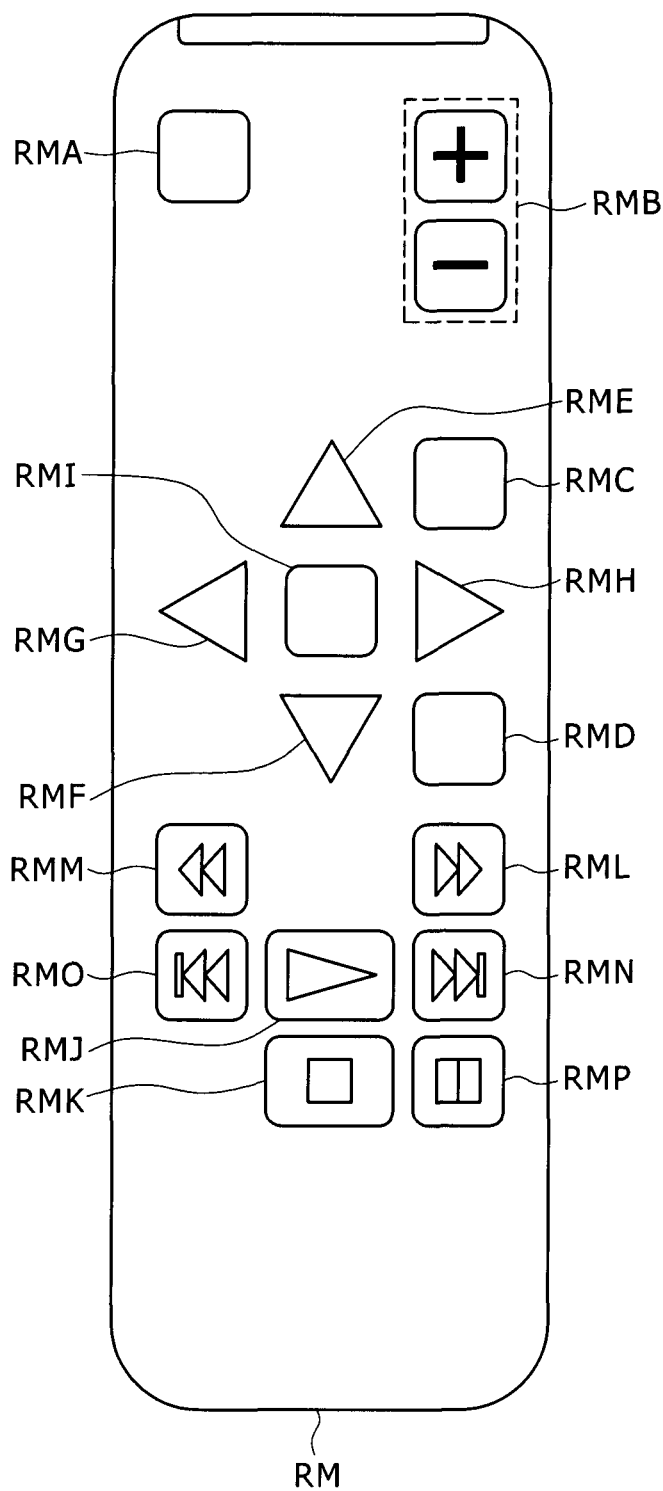
FIG. 3 is a schematic view showing a typical structure of a remote controller.

Illustratively, the input unit 12 of the reproducing apparatus 10 has a rectangular solid-shaped remote controller RM such as one shown in FIG. 3. On the front of the remote controller RM toward one of its edges are a toggle-type power switch RMA for turning on and off the reproducing apparatus 10 and volume control buttons RMB for adjusting the volume of the music being reproduced. On the front of the remote controller RM toward the middle are a toggle-type function selection button RMC for switching from one function to another and a setting button RMD for calling up diverse settings. Also on the front of the remote controller RM at its center are triangular directional buttons RME and RMF pointing upward and downward respectively and used to select the upward and the downward directions on the display screen; triangular directional buttons RMG and RMH pointing left and right respectively and used to select the leftward and the rightward directions on the display screen; and an enter button RMI for finalizing the selection made illustratively on the display screen.

On the front of the remote controller RM toward its other edge are a reproduction start button RMJ, a reproduction stop button RMK, a fast forward button RML, a fast rewind button RMM, a skip forward button RMN, a skip backward button RMO, and a hold button RMP for controlling music data reproduction. The reproducing apparatus 10 allows the user simply to push the function selection button RMC on the remote controller RM of the input unit 12 in order to select any one of the above-mentioned functions.

When an instruction to select the medium reproduction function is input by the user operating the input unit 12 (i.e., remote controller RM), the control unit 11 activates the medium reproduction function. The control unit 11 causes the reproduction unit 13 to reproduce music data from the recording medium loaded inside the unit 13 and to output the reproduced data as music. In this manner, the control unit 13 allows the user to enjoy music derived from the reproduced music data.

When an instruction to select the recording function is input by the user operating the input unit 12 (i.e., remote controller RM), the control unit 11 activates the recording function. The control unit 11 causes the reproduction unit 13 to read music data from the recording medium and to compress the retrieved music data using a predetermined compression encoding method, before sending the compressed data to a content data storage unit 14. In this manner, the control unit 11 stores music data into the content data storage unit 14 in such formats as ATRAC3 (Adaptive Transform Acoustic Coding 3), AAC (Advance Audio Coding), WMA (Windows (registered trademark) Media Audio), RealAUDIO G2 Music Codec, and MP3 (MPEG Audio Layer-3).

Furthermore, when an instruction to request acquisition of music data is input by the user operating the input unit 12, the control unit 11 causes a communication unit 15 to access an external apparatus 16 on a network NT and to request delivery of music data from the accessed apparatus 16. The control unit 11 thus downloads the music data of interest from the external apparatus 16 through the communication unit 15 and forwards the downloaded data to the content data storage unit 14. In this manner, the control unit 11 stores the music data downloaded from the external apparatus 16 into the content data storage unit 14.

Figure 4:
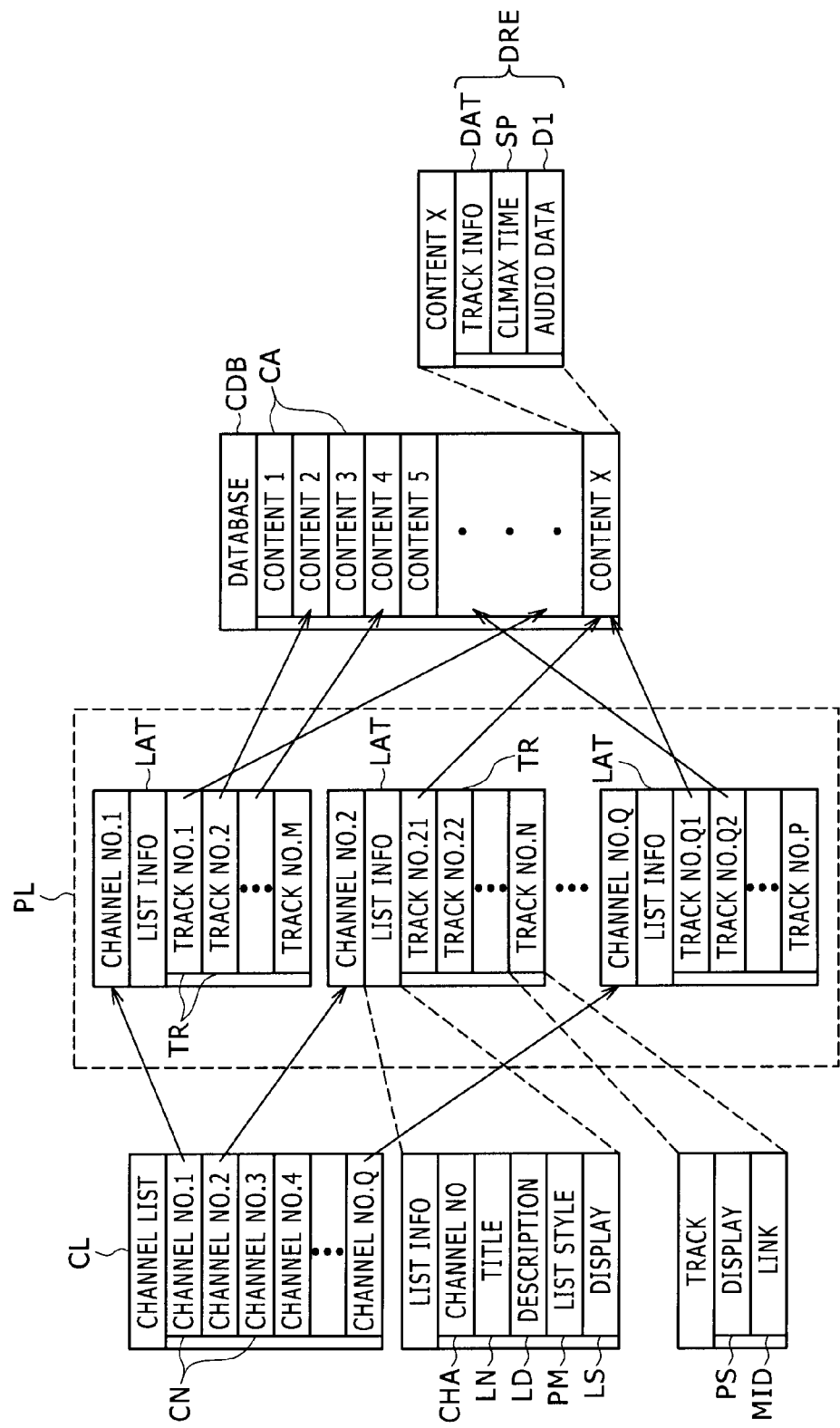
FIG. 4 is a schematic view showing typical structures of a content database and a play list.

As shown in FIG. 4, the control unit 11 has a database for music data management (called the content database) CDB established in the content data storage unit 14. Upon reading music data D1 from the recording medium or downloading the music data D1 from the external apparatus 16, the control unit 11 executes the recording function to record the acquired music data D1 to the content database CDB in the content data storage unit 14 along with related information about the music data D1 (called the data-related information DRE). The data-related information DRE in this case includes two kinds of information: attribute information about each music data item D1 (called the data attribute information DAT); and specific position information SP indicative of a specific portion which is typically called a chorus of the music data item D1 of interest and which starts from a position called the specific position that points illustratively to the beginning of the chorus.

The data attribute information DAT includes the title of each music data item D1 (music titles), name of the artist associated with the music data item D1 in question (artist names), and name of the genre to which the music data item D1 belongs (genre names). The data attribute information DAT also includes the date of storage of each music data item D1, diverse information such as a total reproduction time of the music data item D1 in question, and image data constituting a jacket photo of the album that contains the music data item D1 (called the jacket photo image data). The data attribute information DAT is either downloaded from an external information providing apparatus (not shown) upon recording of the music data item D1 of interest from the recording medium, or downloaded from the external apparatus 16 together with the music data item D1.

In addition, the control unit 11 has a plurality of play lists PL stored in the content storage unit 14, each play list defining the sequence in which to reproduce a plurality of music data items D1. The control unit 11 also has a channel list CL stored in the content data storage unit 14. The channel list CL lists a plurality of channels each of which is allocated a single play list PL in a manner similar to that in which the channels of radio broadcasting stations are allocated. The channel list CL has channel numbers CN arranged in a predetermined sequence (e.g., in ascending order), each channel number serving as identification information uniquely identifying each of the multiple channels.

Each of the play lists PL above has attribute information about the play list PL in question (called the list attribute information LAT). Each play list PL contains a plurality of music registration information items TR for registering a plurality of music data items D1 in the play list PL in question, the music registration information items TR being arranged in a previously selected sequence in which to reproduce the multiple music data items D1.

The list attribute information LAT includes channel allocation information CHA indicating the channel numbers CN allocated to each play list PL, and list name information LN denoting the name of each play list PL (called the list name). The list names also serve as the names of the channels to which the play lists PL are allocated. The list attribute information LAT also includes list detail information LD made up of particular explanations in text data about the structure of each play list PL.

Furthermore, the list attribute information LAT includes reproduction mode information PM indicating one of two reproduction modes: sequential reproduction mode in which a plurality of music data items D1 registered in a given play list PL are reproduced in a predetermined sequence, and shuffle reproduction mode in which the multiple music data items D1 are reproduced in a random sequence. One of the reproduction modes may be selected illustratively by the user. The list attribute information LAT also includes reproduction use setting information LS indicating whether the play list PL of interest is to be used to reproduce the music data items D1. Whether or not to use the play list PL for reproduction of the music data items D1 may be determined illustratively by the user.

The music registration information items TR held in a given play list PL are created to correspond with each of the music data items D1 registered in the play list PL in question. Each music registration information item TR includes reproduction setting information PS specifying whether or not to reproduce the corresponding music data item D1 registered in the play list PL. Illustratively, the user is allowed to determine whether or not to reproduce individually the music data items D1 registered in each play list PL. Each music registration information item TR also includes information called content designation information MID identifying the storage location from which to reproduce the corresponding music data item D1 (e.g., the location may be an address in the content data storage unit 14) registered in the play list PL.

Illustratively, the list detail information LD in a given play list PL includes information called a reproducible data item count indicating the total number of reproducible music data items D1 out of the music data items D1 registered in the play list PL in question. This reproducible music data item count is updated every time any music data item D1 is changed in its setting from nonreproducible to reproducible or vice versa.

With some play list PL, every time a new music data item D1 is added to the content database CDB of the content data storage unit 14, that music data item ID may be automatically registered in the play list PL for a registration update. Another play list PL may be created by registering music data items D1 acquired through searches using keywords such as subjectively perceived impressions or images of music, artist names, and genre names. Yet another play list PL may have its internal registrations updated as needed by automatically registering a predetermined number of music data items D1 that are preselected in descending order of the numbers of times each of these music data items D1 has been reproduced so far.

The control unit 11 allows the user to select any one of these diverse play lists PL for access to relevant channels. In keeping with the play list PL1 selected by the user, the control unit 11 reads successively a plurality of music data items D1 from the play list PL1 of interest held in the content data storage unit 14 and causes the reproduction unit 13 to reproduce the retrieved music data items D1. In this manner, the control unit 11 allows the user continuously to listen to a plurality of songs of which the perceived images or impressions are close to the user's preferences, as well as a plurality of songs of the preferred artist or in the preferred genre.

When an instruction to select the list-using reproduction function is input by the user operating the input unit 12 (i.e., remote controller RM), the control unit 11 activates the list-using reproduction function. With the reproducing apparatus 10 in a stopped state (i.e., power-off state), selecting the list-using reproduction function by operating the input unit 12 prompts the control unit 11 to start up the reproducing apparatus 10 (i.e., turns it on) and to activate the list-using reproduction function at the same time. With another function currently executed, selecting the list-using reproduction function through the input unit 12 causes the control unit 11 to switch off the ongoing function and activate the list-using reproduction function.

At each deactivation of the list-using reproduction function, the control unit 11 retains the channel number CN of the channel most recently selected (i.e., last selected) by the user. The control unit 11 also preserves the channel number CN of a preselected channel to be used upon initial activation of the list-using reproduction function. The control unit 11 is set automatically to select either the most recently selected channel in effect at the last deactivation of the list-using reproduction function, or the preselected channel every time the list-using reproduction function is activated.

Depending on its settings as mentioned above, the control unit 11 has either the most recently selected channel from the last deactivation of the list-using reproduction function or the preselected channel established as the channel number CN called the post-activation use channel number that is automatically selected at each activation of the list-using reproduction function. Every time the list-using reproduction function is started, the control unit 11 automatically selects the channel of the post-activation use channel number and reads both the channel list CL and the play list PL allocated to the automatically selected channel from the content data storage unit 14.

In accordance with the content designation information MID in each music registration information item placed in the play list PL, the control unit 11 reads the corresponding music data item D1 and data-related information DRE from the content data storage unit 14 and forwards the retrieved music data item D1 to the reproduction unit 13 together with the specific position information SP included in the data-related information DRE. Given the specific position information SP, the reproduction unit 13 starts reproducing the music data item D1 from its specific position, allowing the user to listen to the reproduced music from the beginning of its specific portion.

When an instruction to change channels is input by the user operating the input unit 12 during reproduction of a music data item D1 starting from its specific position (i.e., halfway between the specific position of the music data item D1 and its ending position), the control unit 11 determines the channel to be selected anew on the basis of the currently selected channel number CN relative to the sequence of the channel numbers CN held in the channel list CL. The control unit 11 reads the play list PL allocated to the newly selected channel from the content data storage unit 14, reads a music data item D1 and data-related information DRE from the play list PL, and sends the retrieved music data item D1 to the reproduction unit 13 together with the specific position information SP included in the data-related information DRE. In turn, the reproduction unit 13 stops reproducing the current music data item D1 and starts reproducing the new music data item D1 from its specific position following data transfer from the control unit 11.

As described, every time the user requests a channel changeover (i.e., every time a channel change instruction is input), the control unit 11 reproduces the music data items D1 from the play lists PL allocated to the newly selected channel, starting from their specific positions. In this manner, the control unit 11 allows the user actually to preview the reproducible (i.e., registered) music data items D1 from the beginning of their specific portions in the play lists PL, before selecting the preferred play list PL for reproduction of its music data items D1.

It might also happen that an instruction to change music data items D1 to be reproduced is input by the user operating the input unit 12 during reproduction of a music data item D1 starting from its specific position. In such a case, according to the currently selected play list PL, the control unit 11 reads a new music data item D1 and data-related information DRE from the content data storage unit 14 as described above, and forwards the retrieved music data item D1 to the reproduction unit 13 together with the specific position information SP included in the data-related information DRE. In turn, the reproduction unit 13 stops reproducing the current music data item D1 and starts reproducing the new music data item D1 from its specific position following data transfer from the control unit 11.

As described, every time the user requests a changeover of music data items D1 (i.e., every time a reproduced music data changeover instruction is input), the control unit 11 starts reproducing the newly selected music data D1 from its specific position. In this manner, the control unit 11 allows the user actually to preview the reproducible (i.e., registered) music data items D1 from the beginning of their specific portions in the play lists PL, before selecting (i.e., searching for) the preferred play list PL for reproduction of its music data items D1.

It might then happen that an instruction to selectively determine the currently reproduced music data item 1 as the preferred music data item D1 is input by the user operating the input unit 12 during reproduction of a music data item D1 starting from its specific position. In this case, the control unit 11 controls the reproduction unit 13 in accordance with the instruction to select the music data item D1 in question. That is, the reproduction unit 13 halts partial reproduction of the current music data item D1 (starting from its specific position) and starts full reproduction of the same music data item D1 from the beginning. In this manner, when the user selects a preferred music data item D1, the control unit 11 allows the user to listen to the entire music data item D1 from the beginning.

It might happen that the user does not request any changeover of channels or music data items D1 during reproduction of the current music data item D1 from its specific position, so that the reproduction unit 13 keeps reproducing the current music data item D1 until its ending is reached. In such a case, according to the currently selected play list PL, the control unit 11 reads from the content data storage unit 14 the next music data item D1 to be reproduced subsequently to the music data item D1 that has just been terminated, along with data-related information DRE. The control unit 11 sends the newly retrieved music data D1 to the reproduction unit 13. In turn, the reproduction unit 13 starts reproducing the next music data item D1 from its beginning following the just-terminated music data item D1.

As described, when a given music data item D1 reproduced starting from its specific position comes to an end, the control unit 11 assumes that the user has requested to listen to a plurality of music data items D1 registered in the currently selected play list PL. In this case, the control unit 11 causes the reproduction unit 13 successively to reproduce the multiple music data items D1 each in its entirety from the current play list PL.

It might happen that an instruction to change reproduced music data items is input by the user operating the unit 12 during reproduction of a given music data item D1 starting from its beginning. In that case, the control unit 1 reads as described above the new music data item D1 and data-related information DRE in accordance with the currently selected play list PL held in the content data storage unit 14, and forwards the retrieved music data item D1 to the reproduction unit 13 together with specific position information SP included in the data-related information DRE. In turn, the reproduction unit 13 stops reproducing the current music data item D1 and starts reproducing the new music data item D1 from its specific position following data transfer from the control unit 11.

As described, upon request to search for a new preferred music data item D1 during reproduction of the user-selected music data item D1, the control unit 11 stops the ongoing reproduction of the current music data item D1. In the manner described above, the control unit 11 proceeds to let the user actually preview the new music data item D1 according to the currently selected play list PL in order to select anew (i.e., search for) the preferred music data item D1.

When an instruction to change channels is input by the user operating the input unit 12 during reproduction of a music data item D1 from the beginning, the control unit 11 determines the channel to be selected anew on the basis of the currently selected channel number CN relative to the sequence of the channel numbers CN held in the channel list CL. The control unit 11 reads the play list PL allocated to the newly selected channel from the content data storage unit 14, reads a music data item D1 and data-related information DRE from the play list PL as described above, and sends the retrieved music data item D1 to the reproduction unit 13 together with the specific position information SP included in the data-related information DRE. In turn, the reproduction unit 13 stops reproducing the current music data item D1 and starts reproducing the new music data item D1 from its specific position following data transfer from the control unit 11.

As described, upon request to change play lists PL1 used to reproduce music data items D1 (i.e., when a channel change instruction is input) during reproduction of a plurality of music data items D1 from the user-selected play list PL, the control unit 11 stops the current reproduction accordingly. In the manner described above, the control unit 11 proceeds to let the user actually preview new music data items D1 from the beginning of their specific portions according to a play list PL that is different from the play list PL currently used to reproduce the music data items D1. The user is thus allowed to select a new play list PL for reproduction of its music data items D1.

Upon activation of the list-using reproduction function, the control unit 11 creates data that constitutes a selection screen based on the channel list CL retrieved from the content data storage unit 14 at that point in time, on the list attribute information LAT held in the current play list PL, and on the data attribute information DAT included in the data-related information DRE, the selection screen being designed for selecting channels and music data D1. The control unit 11 sends the selection screen data thus created to a display processing unit 17. Given the selection screen data, the display processing unit 17 displays a selection screen 20 such as one shown in FIG. 5.

Figure 5:
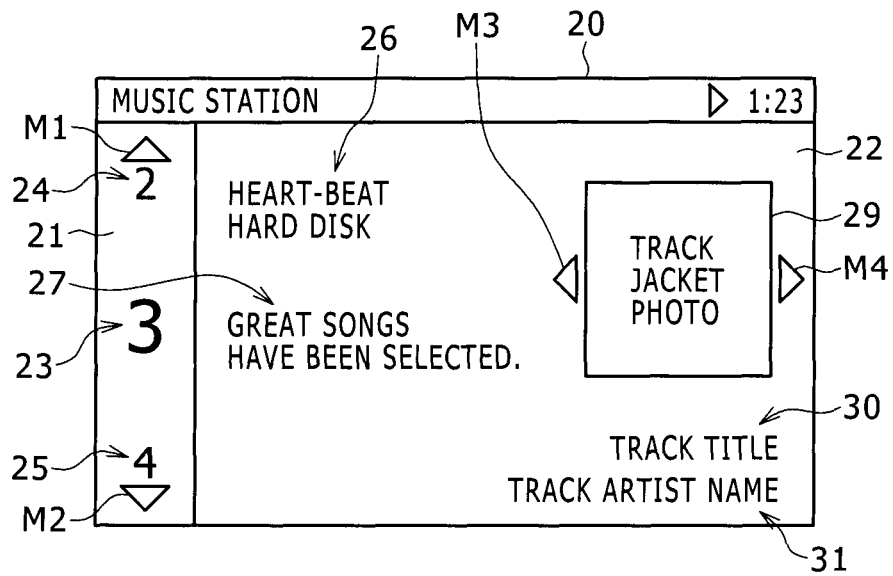
FIG. 5 is a schematic view showing a typical structure of a selection screen.

The selection screen 20 in FIG. 5 has a vertically elongated channel selection area 21 established on the left-hand side of the screen and a music selection area 22 set up on the remaining right-hand side. In the middle of the channel selection area 21 is a selected channel indicator icon 23 indicating the currently selected channel using its channel number CN. At the top and the bottom of the channel selection area 21 are selectable channel indicator icons 24 and 25 indicating the channels by means of their channel numbers that may be reached from the currently selected channel in the sequence of the channel numbers CN held in the channel list CL.

In the channel selection area 21 above the upper selectable channel indicator icon 24 is a first triangular mark M1 pointing upward. The first mark M1 allows the user intuitively to recognize a channel selecting operation that may be performed on the selection screen 22. This operation involves changing from one preferred channel number CN to another (indicated by the selected channel indicator icon 23 in the middle of the area 21) in descending order by successively pushing, illustratively on the remote controller RM, the triangular directional button RME pointing in the same upward direction as the mark K1 and having approximately the same shape.

Also in the channel selection area 21 under the lower selectable channel indicator icon 25 is a second triangular mark M2 pointing downward. The second mark M2 allows the user intuitively to recognize another channel selecting operation that may be performed on the selection screen 22. This operation involves changing from one preferred channel number CN to another (indicated by the selected channel indicator icon 23 in the middle of the area 21) in ascending order by successively pushing, also on the remote controller RM, the triangular directional button RMF pointing in the same downward direction as the mark K2 and having approximately the same shape.

On the left-hand side of the music selection area 22 is a list name 26 of the play list PL allocated to the currently selected channel, as well as a particular explanation 27 of the structure of the play list PL in question (i.e., explanation based on text data making up the above-mentioned list detail information LD). On the right-hand side of the music selection area 22 is a jacket photo image 29 as information about the currently reproduced music data item D1. Under the jacket photo image 29 are a music title 30 and an artist name 31.

To the left of the jacket photo image 29 in the music selection area 22 is a third triangular mark M3 pointing illustratively leftward. The third mark M3 allows the user intuitively to recognize a music data selecting operation that may be performed on the selection screen 22. This operation involves changing from the currently reproduced music data item D1 to the preceding music data item D1 according to the play list PL by pushing once, illustratively on the remote controller RM, the triangular directional button RMG pointing in the same leftward direction as the mark K3 and having approximately the same shape.

To the right of the jacket photo image 29 in the music selection area 22 is a fourth triangular mark M4 pointing illustratively rightward. The fourth mark M4 allows the user intuitively to recognize another music data selecting operation that may be performed on the selection screen 22. This operation involves changing from the currently reproduced music data item D to the immediately following (i.e., next) music data item D1 according to the play list PL by pushing once, also on the remote controller RM, the triangular directional button RMH pointing in the same rightward direction as the mark K4 and having approximately the same shape.

The channels are changed according to the sequence of the channel numbers CN held in the channel list CL. With the selection screen 20 displayed on a display unit 18 by the display processing unit 17, the control unit 11 may receive a channel change instruction input by the user pushing the upward-pointing selection button RME or downward-pointing selection button RMF on the remote controller RM. Upon receipt of the channel change instruction, the control unit 11 determines the channel to be selected based on the currently selected channel number CN and on the changing direction corresponding to the just-pushed selection button RME or RMF. The control unit 11 is arranged to change cyclically the channel numbers CN in such a manner that the last channel number is linked to the first channel number in a loop during reproduction.

Given the channel thus determined, the control unit 11 reads the new play list PL and data attribute information DAT from the content data storage unit 14, creates new selection screen data based on what has been read, and forwards the newly created selection screen data to the display processing unit 17. Based on the selection screen data sent from the control unit 11, the display processing unit 17 updates what is currently displayed on the selection screen 20. In this manner, the control unit 11 lets the user actually preview music of the music data items D1 from the beginning of their specific portions while visually ascertaining the selected channel indicator icon 23 and list name 26 on the selection screen 20. The user is thus allowed to select the preferred play list PL for reproduction of its music data items D1.

The music data items D1 being reproduced are changed according to the order in which to reproduce the music data items D1 registered in each play list PL. With the selection screen 20 displayed on the display unit 18 by the display processing unit 17, the control unit 11 may receive a reproduced music change instruction input by the user pushing the leftward-pointing selection button RMG or rightward-pointing selection button RMH on the remote controller RM. Upon receipt of the reproduced music change instruction, the control unit 11 determines the music data item D1 to be selected based on the order defined by the current play list PL1 for reproduction of its music data items D1 (i.e., in either sequential or random mode) and on the changing direction corresponding to the just-pushed selection button RMG or RMH. The control unit 11 is arranged to change cyclically the content designation information items MID representing the music data items D1 to be reproduced in the order defined by the play list PL, in such a manner that the last music data item D1 is linked to the first music data item D1 in a loop during reproduction.

Given the music data item D1 thus determined, the control unit 11 reads new data-related information DRE from the content data storage unit 14, creates new selection screen data using the data attribute information DAT included in the data-related information DRE, and forwards the newly created selection screen data to the display processing unit 17. Based on the selection screen data sent from the control unit 11, the display processing unit 17 updates what is currently displayed on the selection screen 20 (i.e., jacket photo image 29, music title 30, and artist name 31). In this manner, the control unit 11 lets the user actually preview music of the music data items D1 from the beginning of their specific portions while visually ascertaining the music title 30, artist name 31, etc., of each data item on the selection screen 20. The user is thus allowed to select the preferred music data item D1 for reproduction.

With the selection screen 20 displayed on the display unit 18 by the display processing unit 17, the control unit 11 may receive a music selection finalizing instruction input by the user pushing the enter button RMI on the remote controller RM. Upon receipt of the music selection finalizing instruction, the control unit 11 creates reproduction screen data designed to indicate the currently reproduced music data item D1 based on the currently selected play list PL and on the data attribute information DAT corresponding to the current music data item D1. The control unit 11 sends the reproduction screen data thus created to the display processing unit 17. In turn, the display processing unit 17 causes the display unit 18 to replace the selection screen 20 with a reproduction screen 40 such as one shown in FIG. 6 through the use of the reproduction screen data.

Figure 6:
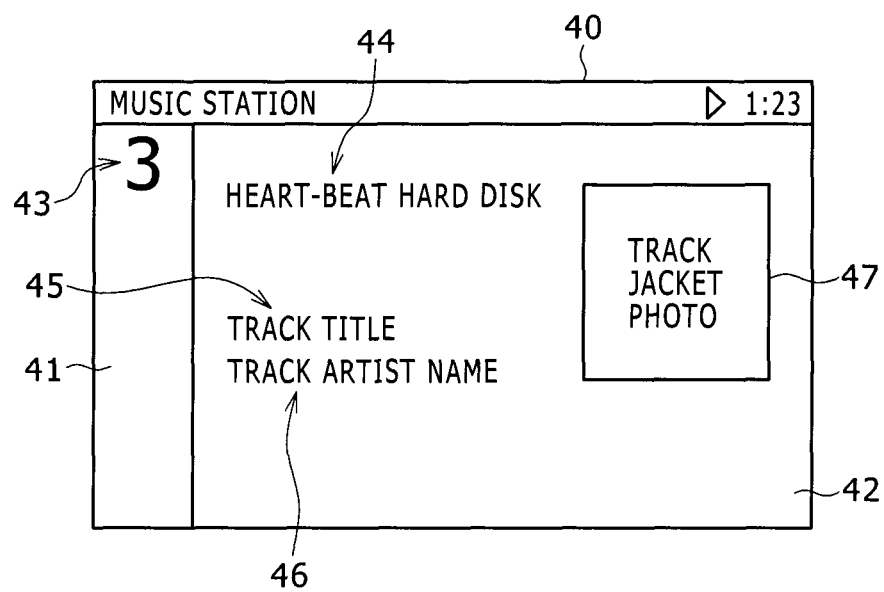
FIG. 6 is a schematic view showing a typical structure of a reproduction screen.

The reproduction screen 40 in FIG. 6 has a selected channel indication area 41 established on the left-hand side of the screen and a reproduced music indication area 42 set up on the remaining right-hand side. In the selected channel indication area 41 is a selected channel indicator icon 43 indicating the currently selected channel by means of its channel number CN. Displayed on the left-hand side of the reproduced music indication area 42 is a list name 44 of the play list PL allocated to the currently selected channel. Also found in the reproduced music indication area 42 is information about the currently reproduced music data item D1, including a music title 45, an artist name 46, and a jacket photo image 47.

With the reproduction screen 40 displayed on the display unit 18 by the display processing unit 17, the control unit 11 may find that a new music data item D1 is reproduced from its beginning according to the play list PL. In that case, the control unit 11 creates new reproduction screen data using the data attribute information corresponding to the music data item D1 in question and sends the newly created data to the display processing unit 17. Based on the reproduction screen data sent from the control unit 11, the display processing unit 17 updates what is currently displayed on the selection screen 20 (i.e., jacket photo image 47, music title 45, and artist name 46). In this manner, whenever the currently reproduced music data item D1 is changed, the control unit 11 can indicate the music data item D1 being reproduced anew by use of the music title 45, artist name 46 and other information displayed on the reproduction screen 40.

It might happen that with the reproduction screen 40 displayed on the display unit 18 by the display processing unit 17, the control unit 11 is requested by the user to change channels or music data items D1 (i.e., the channel change instruction or reproduced music change instruction is received). In such a case, the control unit 11 creates the selection screen data as described above and sends the created data to the display processing unit 17. In turn, the display processing unit 17 causes the display unit 18 to change from the reproduction screen 40 to the selection screen 20.

Figure 7:
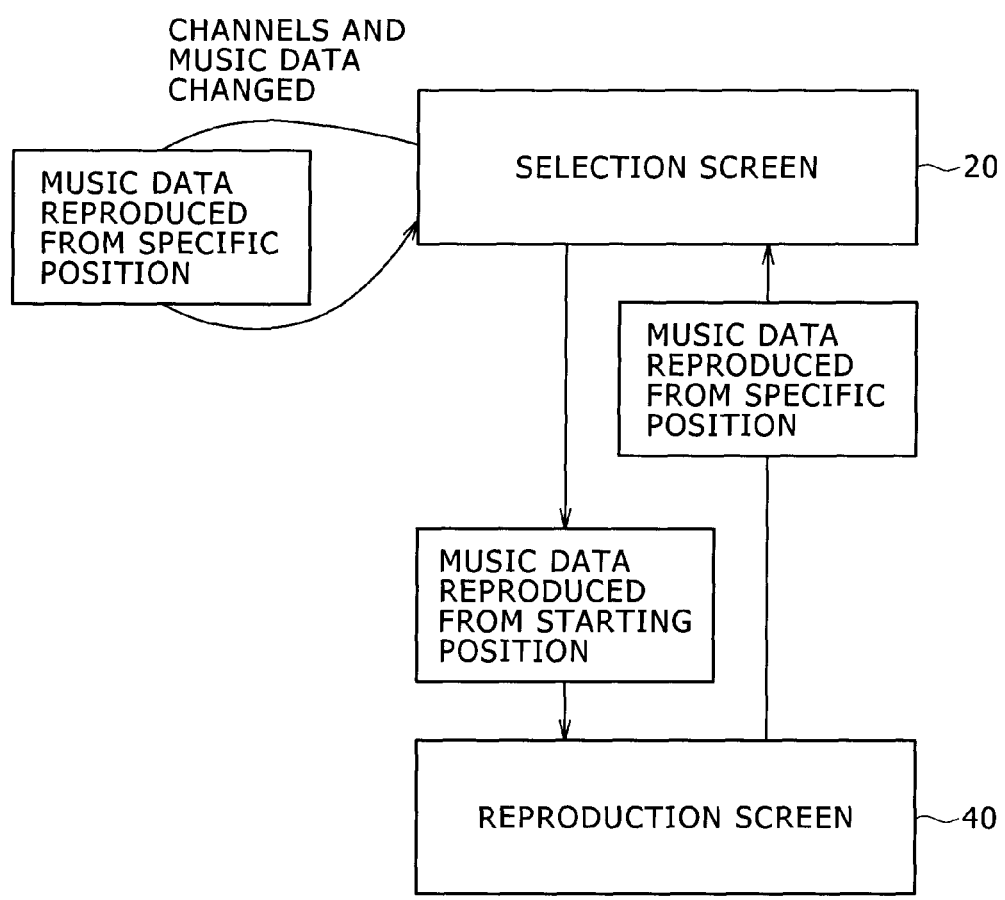
FIG. 7 is a schematic view explanatory of how display screens are changed upon execution of a list-using reproduction function.

As shown in FIG. 7, when the list-using reproduction function is activated, the control unit 11 effects transition to reproduction limited mode in which music data items D1 are reproduced starting from their specific portions. At this point, the control unit 11 controls the display processing unit 17 to display the selection screen 20 on the display unit 18. Every time the user requests to change channels or music data items D1 in the above state, the control unit 11 controls the reproduction unit 13 to start reproducing the newly selected music data item from its specific position, thus allowing the user to preview the desired music data from the beginning of its specific portion. Whenever channels or music data items D1 are changed, the control unit 11 causes the display processing unit 17 to update what is currently displayed on the selection screen 20 (i.e., information about the play list PL and music data item D1) appearing on the display unit 18.

When the selection of a given music data item D1 is finalized (i.e., when the music selection finalizing instruction is input) or when partial reproduction of a music data item D1 starting from its specific position is terminated in reproduction limited mode (i.e., when the ending of the music data item is reached), the control unit 11 leaves reproduction limited mode and enters limitation canceled mode in which the limitation on reproduction is canceled. In this case, the control unit 11 controls the reproduction mode 13 to start reproducing the newly selected or newly reached music data item D1 from its starting position, allowing the user to listen to the preferred music from beginning to end. At this point, the control unit 11 causes the display processing unit 17 to change from the selection screen 20 to the reproduction screen 40 on the display unit 18.

Upon termination of full reproduction of the music data item D1 from its starting position in limitation canceled mode (i.e., when reproduction has reached the ending position), the control unit 11 controls the reproduction unit 13 to start reproducing the newly reached music data item D1 from the beginning, thus allowing the user to listen to the new music data item from beginning to end. At this point, the control unit 11 causes the display processing unit 17 to update what is currently displayed on the reproduction screen 40 (i.e., information about the music data item D1) appearing on the display unit 18.

If the user requests to change channels or music data items D1 in limitation canceled mode, the control unit 11 leaves limitation canceled mode and enters reproduction limited mode. In this case, the control unit 11 controls the reproduction unit 13 to start reproducing the new music data item D1 from its specific position, allowing the user to listen to the music from the beginning of its specific portion. At this point, the control unit 11 causes the display processing unit 17 to change from the reproduction screen 40 to the selection screen 20 on the display unit 18.

Figure 8:
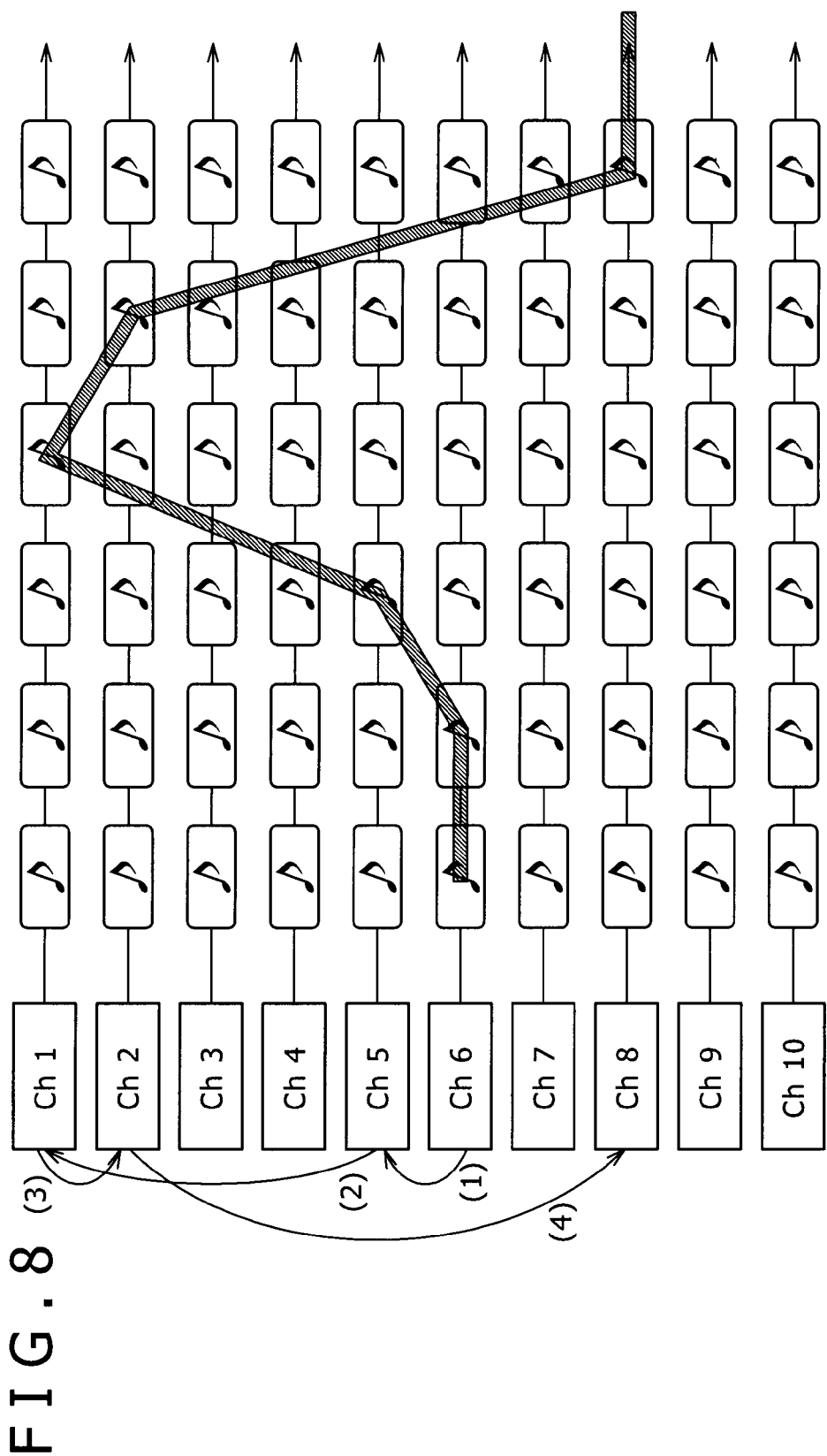
FIG. 8 is a schematic view explanatory of how music data being reproduced is changed at channel changeovers.

Thus as shown in FIG. 8, while the list-using reproduction function is being active, the control unit 11 allows the user to change channels as if changing from one radio station to another during radio broadcast reception, so that the user may easily select preferred music data items D1 while previewing their specific portions from the beginning according to the play list PL allocated to the currently selected channel. With the list-using reproduction function kept active, the control unit 11 successively reproduces the music data items D1 from the beginning or starting from their specific positions so as to let the user listen to as much music as possible in uninterrupted fashion.

In addition to the above-described structure, the reproducing apparatus 10 supports fade-out/fade-in reproduction. That is, upon request to change channels or music data items D1, the control unit 11 controls the reproduction unit 13 to lower the volume of the currently reproduced music data item D1 gradually from its normal audio level until, say, a "0" data level of the current music data D1 is reached in what is known as fade-out reproduction, and to raise the volume of the next music data item D1 gradually from the "0" data level of its specific position until the normal audio level of the next music data D1 is reached in what is known as fade-in reproduction.

In the description that follows, the term "normal reproduction" will refer to a mode of reproduction in which the audio level of the music data D1 is not forcibly changed during reproduction, as opposed to the fade-out or fade-in reproduction whereby the audio level of the music data D1 is deliberately altered. Also in the ensuing description, normal reproduction, fade-out reproduction and fade-in reproduction may be simply referred to as reproduction where appropriate. When the user requests to change channels or music data items D1 during normal reproduction of the music data item D1 starting from the beginning, during fade-in reproduction of the music data item D1 starting from its specific position, or during normal reproduction following the completion of fade-in reproduction of the music data item D1 that started from its specific position, the control unit 11 accepts the request and changes channels or music data items D1 accordingly.

That is, when the user requests to change music data items D1, the currently reproduced music data D1 is in one of three states: halfway into normal reproduction of the music data item D1 starting from the beginning; halfway into fade-in reproduction of the music data item D1 starting from its specific position; or halfway into normal reproduction following the completion of fade-in reproduction of the music data item D1 that started from its specific position. Thus the music data item D1 being reproduced starting from its specific position is, as will be discussed later, a music data item D1 that is either halfway into fade-in reproduction starting from the specific position of the data item or halfway into normal reproduction following the completion of fade-in reproduction that started from the specific position of the data item.

As shown in FIGS. 9A through 9D, the currently reproduced music data item D1 may be faded out followed by the next music data item D1 being faded in for music data changeover, illustratively by resorting to one of a first through a fourth music data changing method outlined hereunder. According to the first music data changing method illustrated in FIG. 9A, starting from a time t1 at which a request is made to change channels or music data items D1 (called the change requested time t1) the currently reproduced music data D1A is faded out over a first fade-out reproduction time FOT1 (e.g., preset for about 500 msec) until a time T2 at which the fade-out reproduction is completed (called the fade-out reproduction complete time t2). Upon completion of the fade-out reproduction (i.e., at time t2), the next music data item D1B is faded in over a first fade-in reproduction time FIT1 which is the same in length as the first fade-out reproduction time FOT1. Upon completion of the fade-in reproduction (called the fade-in reproduction complete time t3), the next music data item is normally reproduced.

Figure 9A:
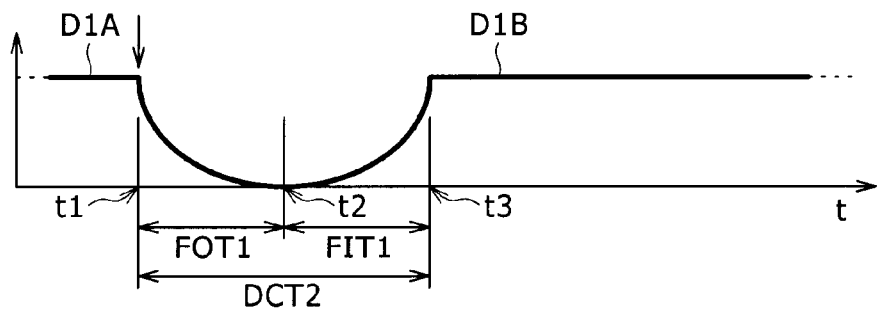
FIGS. 9A through 9D are schematic views explanatory of how fade-out reproduction and fade-in reproduction take place upon music data changeover.
Figure 9B:
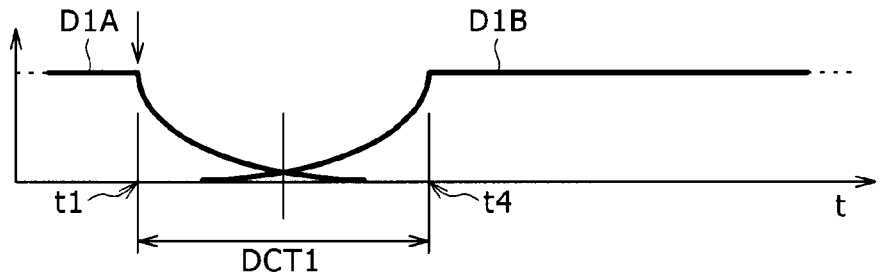

According to the second music data changing method as illustrated in FIG. 9B, the currently reproduced music data D1A is faded out starting from the change requested time t1. Before the fade-out reproduction is complete, the next music data item D1B is faded in starting from its specific position so that the fade-out reproduction and fade-in reproduction proceed in partially overlapping fashion called cross fade. Although the second music data changing method adopts the same fade-out reproduction time FOT1 and the same fade-in reproduction time FIT1 as the first music data changing method, the recourse to cross fade by the second method makes the interval between the change requested time t1 (i.e., time at which fade-out reproduction is started) and the fade-in reproduction complete time t4 (the interval is called the music data changing time DCT1) shorter than a music data changing time DCT2 under the first music data changing method.

Figure 9C:
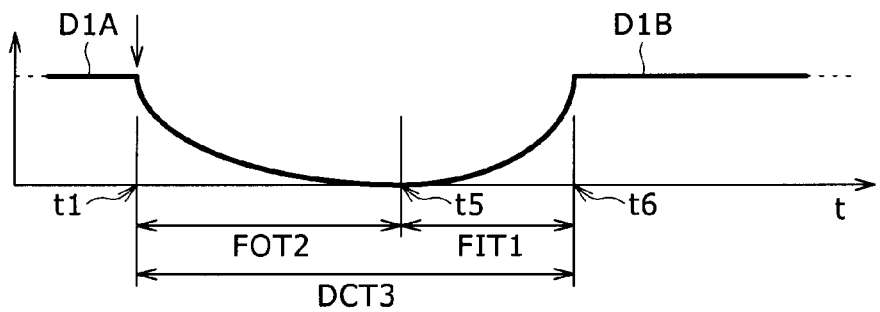

According to the third music data changing method as illustrated in FIG. 9C, starting from the change requested time t1, the currently reproduced music data item D1A is faded out over a second fade-out reproduction time FOT2 (e.g., preset for about 750 msec) longer than the first fade-out reproduction time FOT1. Past a fade-out reproduction complete time t5, the next music data item D1B is faded in starting from its specific position over the first fade-in reproduction time FIT1. Because the third music data changing method adopts the second fade-out reproduction time FOT2 that is longer than the first fade-out reproduction time FOT1, a music data changing time DCT3 between the change requested time t1 and a fade-in reproduction complete time t6 under the third method is longer than the music data changing time DCT2 under the first music data changing method.

Figure 9D:
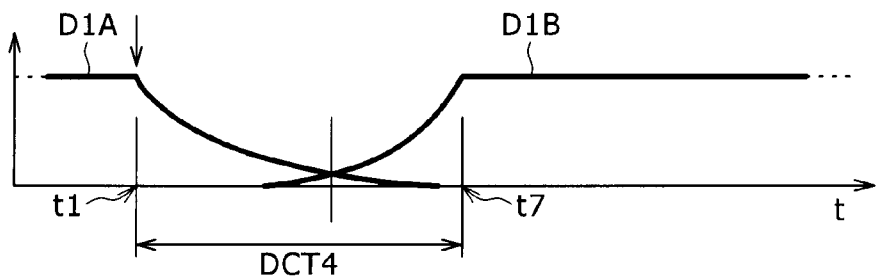

The fourth music data changing method, as illustrated in FIG. 9D, adopts cross fade in conjunction with the second fade-out reproduction time FOT2 and the first fade-in reproduction time FIT1, the same time settings as those used by the third music data changing method. The recourse to cross fade by the fourth method makes the interval between the change requested time t1 and a fade-in reproduction complete time t7 (the interval is called the music data changing time DCT4) shorter than the music data changing time DCT3 under the third music data changing method.

When a request is made to change channels or music data items D1 during reproduction of the current music data item D1A starting from its specific position, the control unit 11 effects screen changeover before starting to fade in the next music data item D1B. Specifically, the control unit 11 controls the display processing unit 17 to change from the selection screen 20 indicating the currently reproduced music data item D1A, to a new selection screen 20 indicating the next music data item D1B on the display unit 18. That is, before starting the fade-in reproduction, the control unit 11 causes the display processing unit 17 to replace the information about the currently reproduced music data item D1A (i.e., jacket photo image 29, music title 30, and artist name 31 corresponding to the current music data item D1A, called the current display information) with the information about the next music data item D1B (i.e., jacket photo image 29, music title 30, and artist name 31 corresponding to the next music data item D1B, called the next display information) on the selection screen 20.

When a request is made to change channels or music data items D1 during normal reproduction of the current music data item D1A starting from the beginning, the control unit 11 also effects screen changeover before starting to fade in the next music data item D1B. Specifically, the control unit 11 controls the display processing unit 17 to change from the reproduction screen 40 indicating the currently reproduced music data item D1A, to a new reproduction screen 40 indicating the next music data item D1B on the display unit 18. That is, before starting the fade-in reproduction, the control unit 11 causes the display processing unit 17 to replace the current display information (i.e., jacket photo image 47, music title 45, and artist name 46) displayed on the reproduction screen 40 with the next display information appearing on the selection screen 20.

Figure 10A:
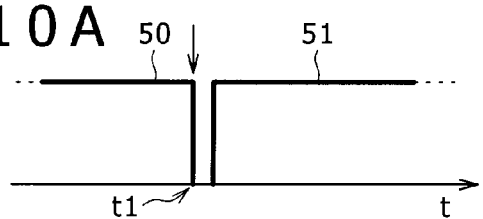
FIGS. 10A through 10E are schematic views explanatory of how display information is changed upon music data changeover.

As shown in FIGS. 10A through 10E, the current display information may be replaced by the next display information in response to the change of music data items D1 using a method selected illustratively from a first through a fifth display information changing method discussed hereunder. The first display information changing method involves changing from current display information 50 to next display information 51 at a change requested time t1, as illustrated in FIG. 10A.

Figure 10B:
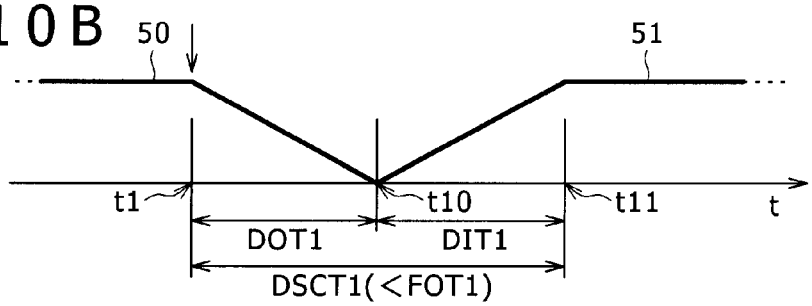

According to the second display information changing method as illustrated in FIG. 10B, the current display information 50 is gradually faded out over a predetermined first display-out time DOT1 starting from the change requested time t1. Starting from a time t10 at which the current display information 50 is completely faded out (t10 is called a display-out complete time), the next display information 51 is gradually faded in over a first display-in time DIT1 that is the same in length as the first display-out time DOT1. According to the second display information changing method, it should be noted, an interval called an information changing time DSCT1 between the change requested time t1 (i.e., where the current display information 50 starts being faded out) and a time t11 at which the normal display of the next display information 51 is fully achieved (t11 is called a display-in complete time) is set to be shorter illustratively than the above-mentioned first fade-out reproduction time FOT1.

Figure 10C:
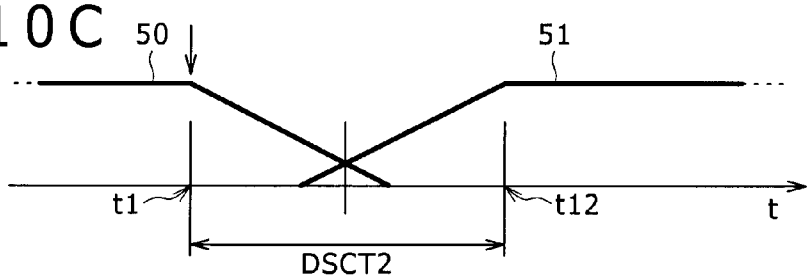

The third display information changing method as illustrated in FIG. 10C involves such changing edit functions as wipe and dissolve. Illustratively, the current display information 50 starts being faded out at the change requested time t1. Before the fade-out of the current display information 50 is completed, the next display information 51 starts getting faded in gradually, so that the fade-out of the current display information 50 and the fade-in of the next display information 51 are effected in a partially overlapping manner. Whereas the third display information changing method adopts the first display-out time DOT1 and the first display-in time DIT1 which are the same as those for the second display information changing method, the third method also resorts to the changing edit functions. For this reason, an interval called an information changing time DSCT2 between the change requested time t1 and a time t12 at which the normal display of the next display information is fully achieved (t12 is called a display-in complete time) is shorter under the third method than the information changing time DSCT1 under the first display information changing method.

Figure 10D:
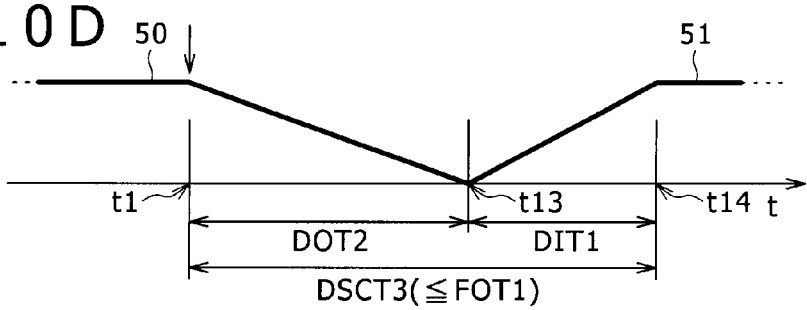

According to the fourth display information changing method as illustrated in FIG. 10D, the current display information 50 is gradually faded out starting from the change requested time t1 over a predetermined second display-out time DOT2 that is longer than the first display-out time DOT1. Starting from a time t13 at which the current display information 50 is completely faded out (t13 is called a display-out complete time), the next display information 51 is gradually faded in over the first display-in time DIT1. Although the current display information 50 is faded out by the fourth display information changing method over the second display-out time DOT2 that is longer than the first display-out time DOT1, an interval called an information changing time DSCT3 between the change requested time t1 and a time t14 at which the normal display of the next display information is fully achieved (t14 is called a display-in complete time) is equal to or shorter illustratively than the above-mentioned first fade-out reproduction time FOT1.

Figure 10E:
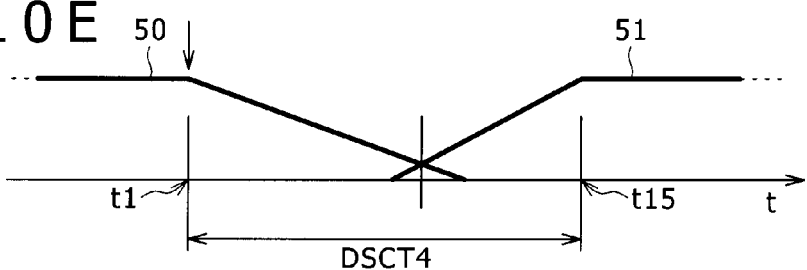

Whereas the fifth display information changing method illustrated in FIG. 10E adopts the second display-out time DOT2 and the first display-in time DIT1 which are the same as those for the fourth display information changing method, the fifth method also resorts to the same changing edit functions as those for the third display information changing method. For this reason, an interval called an information changing time DSCT4 between the change requested time t1 and a time t15 at which the normal display of the next display information is fully achieved (t15 is called a display-in complete time) is shorter under the fifth method than the information changing time DSCT3 under the fourth display information changing method.

According to the first display information changing method, if the selection screen 20 is used to indicate both the currently reproduced music data item D1 and the next music data item D1, then the current display information 50 is replaced with the next display information 51 in one of two ways: either by changing the entire selection screen 20, or by replacing the current display information 50 alone with the next display information 51 on the same selection screen. Also according to the first display information changing method, if the reproduction screen 40 is used to indicate the currently reproduced music data item D1 while the selection screen 20 is used to indicate the next music data item D1, then the current display information 50 is replaced with the next display information 51 by effecting transition from the reproduction screen 40 to the selection screen 20.

According to the second through the fifth display information changing methods, if the selection screen 20 is used to indicate both the currently reproduced music data item D1 and the next music data item D1, then the current display information 50 is gradually replaced with the next display information 51 in one of two ways: either by gradually fading out the current selection screen 20 while gradually fading in the next selection screen 20 so that the current display information 50 gradually disappears and the next display information 51 gradually emerges; or by gradually fading out the current display information 50 alone while gradually fading in solely the next display information on the same selection screen 20. Also according to the second through the fifth display information changing methods, if the reproduction screen 40 is used to indicate the currently reproduced music data item D1 while the selection screen 20 is used to indicate the next music data item D1, then the current display information 50 is gradually replaced with the next display information 51 by gradually fading out the reproduction screen 40 and gradually fading in the selection screen 20.

As shown in FIG. 11, the control unit 11 allows the user illustratively to select any one of the first through the fourth music data changing method and any one of the first through the fifth display information changing method. When the list-using reproduction function is activated, the control unit 11 brings the user-selected music data changing method and display changing method into effect. With the list-using reproduction function kept active, every time the user requests to change channels or music data items D1, the control unit 11 controls the reproduction unit 13 and display processing unit 17 according to the user-selected music data changing method (one out of four) and display information changing method (one out of five), respectively.

Figure 12A:
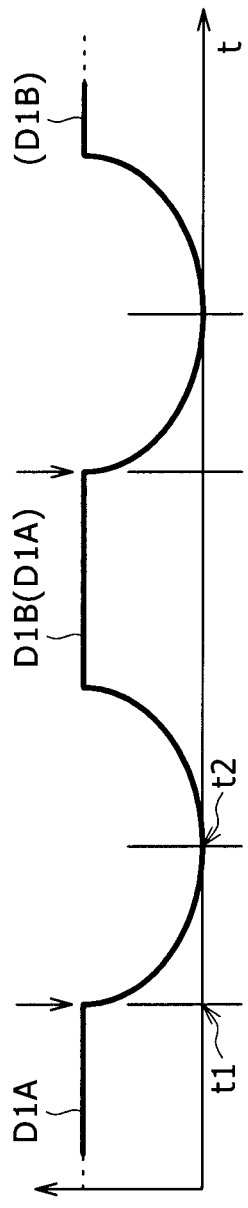
FIGS. 12A and 12B are schematic views explanatory of how music data and display information are changed upon request during music data reproduction.
Figure 12B:
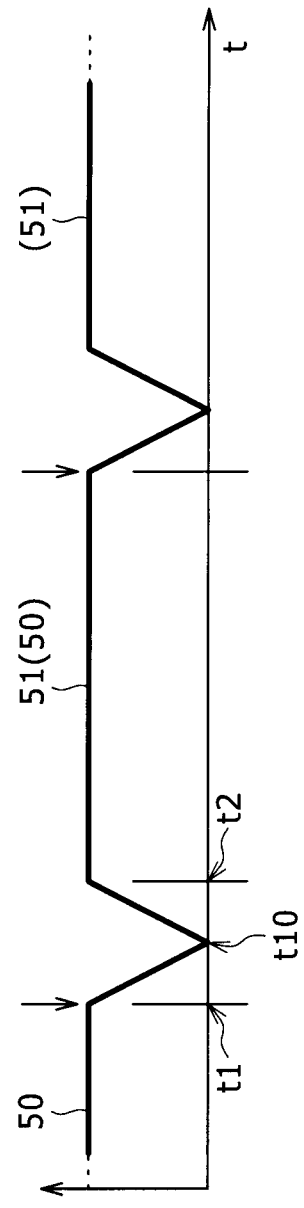

Described below in reference to FIGS. 12A through 14B is how music data items D1 and display information are typically changed when the first music data changing method and the second display information changing method are set to be used during activation of the list-using reproduction function. Suppose that a request is made to change channels or music data items D1 during normal reproduction of the current music data item D1A from the beginning or during partial reproduction of the same data item D1A starting from its specific position. In that case, as shown in FIGS. 12A and 12B, the control unit 11 causes the reproduction unit 13 to fade out the currently reproduced music data item D1A starting from the change requested time T1 and, upon completion of the fade-out reproduction, to fade in the next music data item D1B starting from its specific position. At the same time, the control unit 11 causes the display processing unit 17 to gradually fade out the current display information 50 starting from the change requested time t1 and, upon complete fade-out of the current display information 50, to gradually fade in the next display information 51. The changeover from the current display information 50 to the next display information 51 is completed over an interval shorter than the first fade-out reproduction time FOT1. Every time a request is made to change channels or music data items D1 during reproduction of the current music data item D1A, the control unit 11 changes the music data items D1 to be reproduced and replaces the current display information 50 with the next display information 51 on the display screen in the manner outlined above.

Suppose also that while the current music data item D1A is being reproduced starting from its specific position, the selection of this music data item D1A is finalized as the preferred music data item D1 (i.e., a music selection finalizing instruction is input). In that case, as shown in FIGS. 13A and 13B, the control unit 11 causes the reproduction unit 13 to fade out the currently reproduced music data D1A starting from a time t20 at which the selection is finalized (t20 is called a selection finalizing time) and, upon completion of the fade-out reproduction, to normally reproduce the same music data item D1A from the beginning (i.e., fade-in reproduction is not carried out here).

When the selection of the music data item D1A currently reproduced starting from its specific position is finalized for normal reproduction from the beginning, the control unit 11 need not change the content of the current display information 50 displayed on the display unit 18. However, upon halting the ongoing reproduction of the music data item D1A starting from its specific position so as to normally reproduce the same music data item D1A from the beginning, the control unit 11 replaces the selection screen 20 displayed so far on the display unit 18 with the reproduction screen 40 different in structure from the selection screen 20. In this case, the control unit 11 causes the display processing unit 17 to gradually fade out the selection screen 20 carrying the current display information starting from the selection finalizing time t20. When the selection screen 20 is completely faded out, the control unit 11 causes the display processing unit 17 to gradually fade in the reproduction screen 40 carrying the same current display information 50. The control unit 11 thus effects transition from the selection screen 20 to the reproduction screen 40 over an interval shorter than the first fade-out reproduction time FOT1.

Figure 14A:
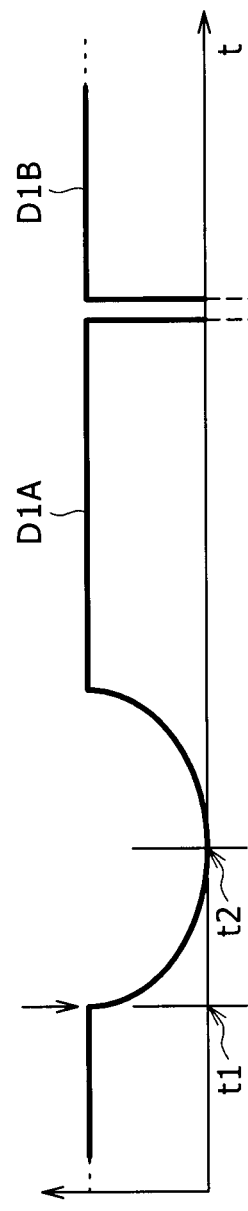
FIGS. 14A and 14B are schematic views explanatory of how music data and display information are changed at the end of music data reproduction.
Figure 14B:
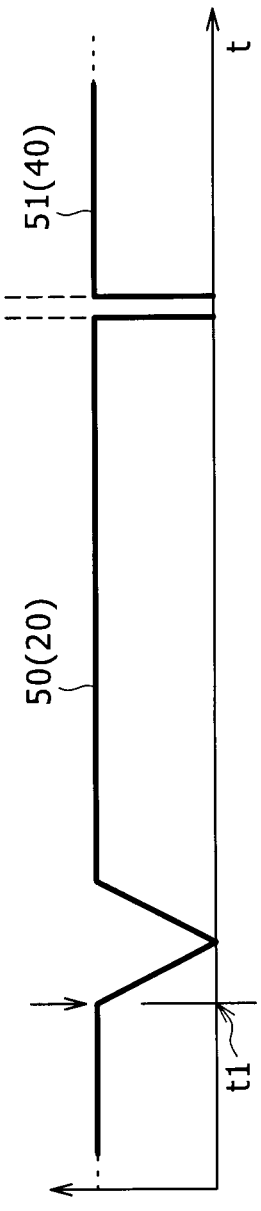
Figure 15A:
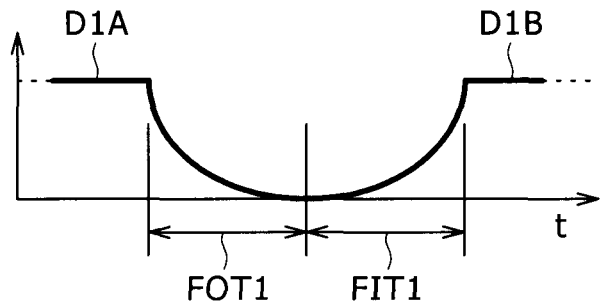
FIG. 15A through 15D are schematic views explanatory of how a fade-out reproduction time and a fade-in reproduction time are set according to a reproducible data item count.
Figure 15B:
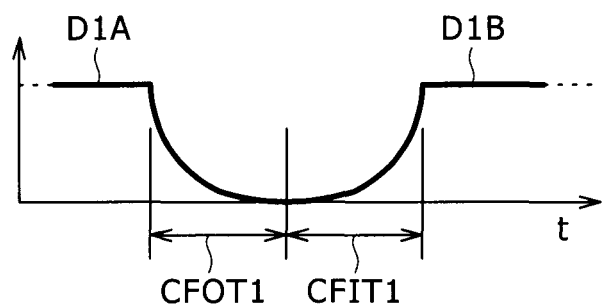
Figure 15C:
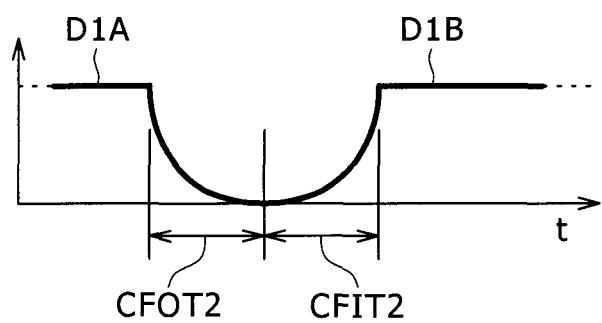
Figure 15D:
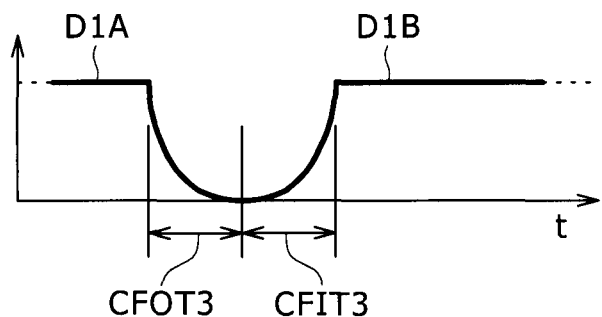
Figure 16A:
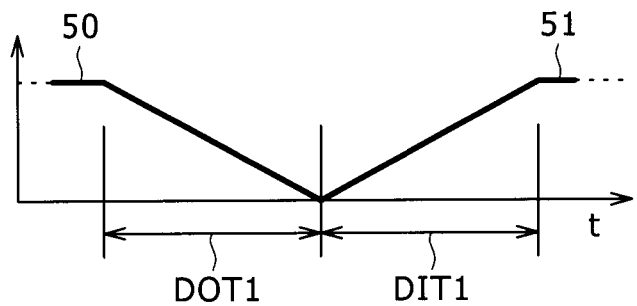
FIGS. 16A through 16D are schematic views explanatory of how a display-out time and a display-in time are set according to the reproducible data item count.
Figure 16B:
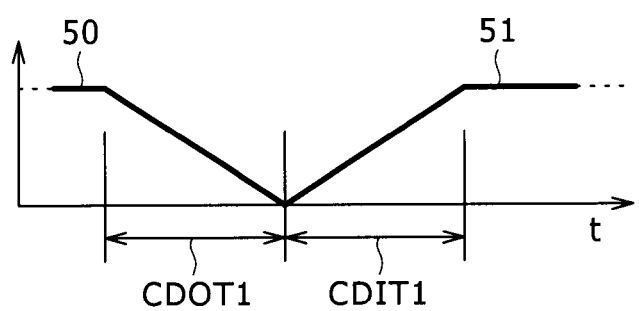
Figure 16C:
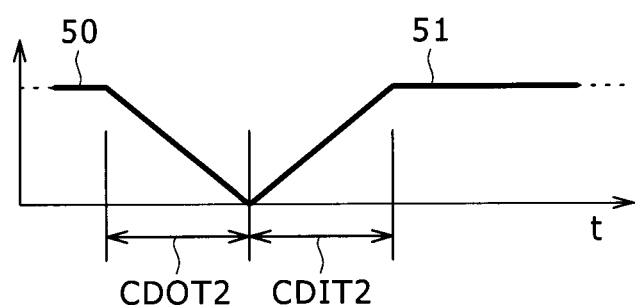
Figure 16D:
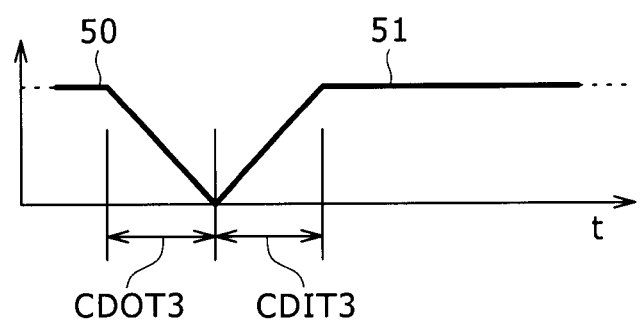

Suppose now that no request is made to change channels or music data items D1 during reproduction of the current music data item D1A starting from its specific position, that the selection of the currently reproduced music data item D1A is not finalized halfway through the reproduction by the reproduction unit 13, and that the reproduction of the music data item D1A eventually reaches its ending position. At this point, as shown in FIGS. 14A and 14B, the control unit 11 causes the reproduction unit 13 to normally reproduce the next music data item D1B starting from the beginning. When music data items D1 are thus changed without being faded out or faded in, the control unit 11 causes the display processing unit 17 to change from the selection screen 20 carrying the current display information 50 to the reproduction screen 40 bearing the next display information 51, illustratively at the end of the reproduction of the current music data item D1A.

When the user requests to change music data items D1, the control unit 11 starts fading out the currently reproduced music data D1A from the change requested time while fading in the next music data item D1B at the same time. With the music data items D1 requested to be changed, it takes some time to replace the currently reproduced music data item D1A with normal reproduction of the next music data item D1B. For that reason, when the music data items D1 are to be changed according to a given play list PL, the control unit 11 allows the user to select whether or not to shorten the first and the second fade-out reproduction times FOT1 and FOT2 as well as the first fade-in reproduction time FIT1 in keeping with the intervals at which the reproduced music change instruction is input.

Such control over the user's selection above may be effected using one of two methods. The first control method involves taking into consideration the above-mentioned number of reproducible data items (i.e., total number of music data items D1 set to be reproduced out of the music data items D1 registered in the play list PL). The second control method involves not taking into account the reproducible data item count at all. When the user is allowed to select whether to shorten the first and the second fade-out reproduction times FOT1 and FOT2 and the first fade-in reproduction time FIT1 in keeping with the intervals at which the reproduced music change instruction is input, the control unit 11 may also prompt the user to select either the first or the second control method. The ensuing description will focus on how to control the first and the second fade-out reproduction times FOT1 and FOT2 and the first fade-in reproduction time FIT1 in accordance with the intervals at which the reproduced music change instruction is input.

With the first control method selected, the control unit 11 reads a play list PL from the content data storage unit 14 and detects the number of reproducible data items from the play list PL. As shown in FIGS. 15A to 15D, if the first music data changing method is assumed to be selected, the control unit 11 compares the reproducible data item count with a first data item count threshold indicative of a predetermined number of music data items. If the comparison reveals the reproducible data item count to be smaller than the first data item count threshold, then the control unit 11 recognizes a condition called the first condition. Under the first condition, the control unit 11 selects a first changed fade-out reproduction time CFOT1 slightly shorter than the first fade-out reproduction time FOT1 and a first changed fade-in reproduction time CFIT1 (i.e., the same as the first changed fade-out reproduction time CFOT1) slightly shorter than the first fade-in reproduction time FIT1.

If the reproducible data item count is found to be equal to or larger than the first data item count threshold, then the control unit 11 compares the reproducible data item count with a second data item count threshold preselected to be larger than the first data item count threshold. If the comparison reveals the reproducible data item count to be smaller than the second data item count threshold (i.e., if the reproducible data item count is equal to or larger than the first data item count threshold but smaller than the second data item count threshold), then the control unit 11 recognizes a condition called the second condition. Under the second condition, the control unit 11 selects a second changed fade-out reproduction time CFOT2 shorter than the first changed fade-out reproduction time CFOT1 and a second changed fade-in reproduction time CFIT2 (i.e., the same as the second changed fade-out reproduction time CFOT2) shorter than the first changed fade-in reproduction time CFIT1.

If the reproducible data item count is found to be larger than the second data item count threshold, then the control unit 11 recognizes a condition called the third condition. Under the third condition, the control unit 11 selects a third changed fade-out reproduction time CFOT3 even shorter than the second changed fade-out reproduction time CFOT2 and a third changed fade-in reproduction time CFIT3 (i.e., the same as the third changed fade-out reproduction time CFOT3) still shorter than the second changed fade-in reproduction time CFIT2. Whereas the foregoing explanation was based on the assumption that the first music data changing method is in use, the control unit 11 may adopt the second music data changing method instead and still select one of the first through the third changed fade-out reproduction times CFOT1 through CFOT3 and one of the first through the third changed fade-in reproduction times CFIT1 through CFIT3 in keeping with the intervals at which the reproduced music change instruction is input.

If the third or the fourth music data changing method is selected to be used, the control unit 11 determines the fade-in reproduction time in the same manner as described above, selecting one of the first through the third changed fade-in reproduction times CFIT1 through CFIT3 in accordance with the intervals at which the reproduced music change instruction is input. Using the same method, however, the control unit 11 determines the fade-out reproduction time differently. With the second fade-out reproduction time FOT2 set as standard in place of the first fade-out reproduction time FOT1, the control unit 11 selects one of three settings constituting a fourth through a sixth fade-out reproduction time in keeping with the intervals at which the reproduced music change instruction is input. The fourth through the sixth fade-out reproduction times are set to be progressively shorter than the second fade-out reproduction time FOT2.

As shown in FIGS. 16A through 16D, if the second display information changing method is adopted and if the reproducible data item count is smaller than the first data item count threshold, then the control unit 11 recognizes the first condition and selects accordingly a first changed display-out time CDOT1 slightly shorter than the first display-out time DOT1 and a first changed display-in time CDIT1 (i.e., the same as the first changed display-out time CDOT1) slightly shorter than the first display-in time DIT1. If the reproducible data item count is found to be equal to or larger than the first data item count threshold but smaller than the second data item count threshold, then the control unit 11 recognizes the second condition and selects accordingly a second changed display-out time CDOT2 shorter than the first changed display-out time CDOT1 and a second changed display-in time CDIT2 (i.e., the same as the second changed display-out time CDOT2) shorter than the first changed display-in time CDIT1.

If the reproducible data item count is found to be larger than the second data item count threshold, then the control unit 11 recognizes the third condition and selects accordingly a third changed display-out time CDOT3 even shorter than the second changed display-out time CDOT2 and a third changed display-in time CDIT3 (i.e., the same as the third changed display-out reproduction time CDOT3) still shorter than the second changed display-in time CDIT2. Whereas the foregoing explanation was based on the assumption that the second display information changing method is in use, the control unit 11 may adopt the third display information changing method instead and still select one of the first through the third changed display-out times CDOT1 through CDOT3 and one of the first through the third changed display-in times CDIT1 through CDIT3 in keeping with the intervals at which the reproduced music change instruction is input.

If the fourth or the fifth display information changing method is selected to be used, the control unit 11 determines the display-in time in the same manner as described above, selecting one of the first through the third changed display-in times CDIT1 through CDIT3 in accordance with the intervals at which the reproduced music change instruction is input. Using the same method, however, the control unit 11 determines the display-out time differently. With the second display-out time DOT2 set as standard in place of the first display-out time DOT1, the control unit 11 selects one of three settings constituting a fourth through a sixth display-out time in keeping with the intervals at which the reproduced music change instruction is input. The fourth through the sixth display-out times are set to be progressively shorter than the second display-out time DOT2.

When the music data items D1 are changed successively for reproduction according to a given play list PL, every time a reproduced music change instruction is input, the control unit 11 resets an internal timer and starts measuring time again. In this manner, the control unit 11 measures the time interval between two reproduced music change instructions being input one after another (the interval is called the instruction input interval). Suppose that the instruction input interval is found to be longer than a first instruction input interval threshold indicative of a predetermined time interval, during reproduction of the music data items D1 being changed successively according to the play list PL. In that case, the control unit 11 establishes the first fade-out reproduction time FOT1 (or second fade-out reproduction time FOT2) as the fade-out reproduction time in which to fade out the music data item D1A currently reproduced when the instruction input interval is measured. At the same time, the control unit 11 establishes the first fade-in reproduction time FIT1 as the fade-in reproduction time in which to fade in the next music data item D1B.

It might happen that one of the second through the fifth display information changing methods is selected to be used when the music data items D1 are changed successively for reproduction according to the play list PL, and that the instruction input interval is equal to or longer than the first instruction input interval threshold indicative of a predetermined time interval. In that case, the control unit 11 establishes the first display-out time DOT1 (or second display-out time DOT2) as the display-out time for the current display information 50 being displayed when the instruction input interval is measured. At the same time, the control unit 11 establishes the first display-in time DIT1 as the display-in time applicable to the next display information 51.

The instruction input interval might be found to be shorter than the first instruction input interval threshold during reproduction of the music data items D1 being changed successively according to the play list PL. If that is the case, the control unit 11 establishes one of the first through the third changed fade-out reproduction times CFOT1 through CFOT3 (or one of the fourth through the sixth changed fade-out reproduction times) selected according to one of the first through the third conditions, as the fade-out reproduction time in which to fade out the music data D1A currently reproduced when the instruction input interval is measured. At the same time, the control unit 11 establishes one of the first through the third changed fade-in reproduction times CFIT1 through CFIT3 selected according to one of the first through the third conditions, as the fade-in reproduction time in which to fade in the next music data item D1B.

It might also happen that one of the second through the fifth display information changing methods is selected to be used when music data items D1 are changed successively for reproduction according to the play list PL, and that the instruction input interval is shorter than the first instruction input interval threshold. In this case, the control unit 11 establishes one of the first through the third changed display-out times CDOT1 through CDOT3 (or one of the fourth through the sixth display-out times) selected according to one of the first through the third conditions, as the display-out time for the current display information 50 being displayed when the instruction input interval is measured. At the same time, the control unit 11 establishes one of the first through the third changed display-in times CDIT1 through CDIT3 selected according to one of the first through the third condition, as the display-in time applicable to the next display information 51.

When a request is actually made to change music data items D1 during their reproduction according to the play list PL, the control unit 11 suitably controls the time it takes to change the music data items D1 or the display information using the above-described settings and in keeping with the intervals at which the reproduced music change instruction is input.

Suppose now that the second control method is selected, that the first music data changing method is adopted, and that the music data items D1 are changed successively for reproduction according to a given play list PL. In that case, every time a reproduced music change instruction is input, the control unit 11 measures the instruction input interval in the same manner as described above. The control unit 11 compares the instruction input interval thus measured with the first instruction input interval threshold. If the instruction input interval is found to be longer than the first instruction input interval threshold, then the control unit 11 establishes the first fade-out reproduction time FOT1 as the fade-out reproduction time in which to fade out the music data item D1A currently reproduced when the instruction input interval is measured. At the same time, the control unit 11 establishes the first fade-in reproduction time FIT1 as the fade-in reproduction time in which to fade in the next music data item D1B.

As shown in FIGS. 17A and 17B, if the instruction input interval is found to be shorter than the first instruction input interval threshold, then the control unit 11 compares the instruction input interval with a second instruction input interval threshold preselected to be shorter than the first instruction input interval threshold. If the comparison reveals the instruction input interval to be equal to or longer than the second instruction input interval but shorter than the first instruction input interval, then the control unit 11 recognizes a condition called the fourth condition. Under the fourth condition, the control unit 11 establishes a seventh changed fade-out reproduction time CFOT4 shorter than the first fade-out reproduction time FOT1 as the fade-out reproduction time in which to fade out the music data item D1A currently reproduced when the instruction input interval is measured. At the same time, the control unit 11 establishes a fourth changed fade-in reproduction time CFIT4 (i.e., the same as the seventh changed fade-out reproduction time CFOT4) shorter than the first fade-in reproduction time FIT1, as the fade-in reproduction time in which to fade in the next music data item D1B.

If the instruction input interval is found to be shorter than the second instruction input interval, then the control unit 11 recognizes a condition called the fifth condition. Under the fifth condition, the control unit 11 establishes an eighth changed fade-out reproduction time CFOT5 even shorter than the seventh changed fade-out reproduction time CFOT4, as the fade-out reproduction time in which to fade out the music data item D1A currently reproduced when the instruction input interval is measured. At the same time, the control unit 11 establishes a fifth changed fade-in reproduction time CFIT5 (i.e., the same as the eighth changed fade-out reproduction time CFOT5) still shorter than the fourth changed fade-in reproduction time CFIT4, as the fade-in reproduction time in which to fade in the next music data item D1B.

Whereas the foregoing explanation was based on the assumption that the first music data changing method is in use, the control unit 11 may adopt the second music data changing method instead and still select either of the seventh and the eighth changed fade-out reproduction times CFOT4 and CFOT5 and either of the fourth and the fifth changed fade-in reproduction times CFIT4 and CFIT5 replacing the first fade-out reproduction time FOT1 and the first fade-in reproduction time FIT1, respectively, in keeping with the intervals at which the reproduced music change instruction is input. If the third or the fourth music data changing method is selected to be used, then the control unit 11 determines the fade-in reproduction time in the same manner as described above, selecting either of the fourth and the fifth changed fade-in reproduction times CFIT4 and CFIT5 replacing the first fade-in reproduction time FIT1 in accordance with the intervals at which the reproduced music change instruction is input. Using the same method, however, the control unit 11 determines the fade-out reproduction time differently. The control unit 11 selects either the sixth or the seventh changed fade-out reproduction time in keeping with the intervals at which the reproduced music change instruction is input, thereby replacing the second fade-out reproduction time FOT2 which in turn was selected in place of the first fade-out reproduction time FOT1 earlier. The sixth and the seventh fade-out reproduction times are set to be progressively shorter than the second fade-out reproduction time FOT2.

If the second display information changing method is set to be used and if the instruction input interval is equal to or longer than the first instruction input interval threshold, then the control unit 11 establishes the first display-out time DOT1 as the display-out time for the current display information 50 being displayed when the instruction input interval is measured. At the same time, the control unit 11 also establishes the first display-in time DIT1 as the display-in time applicable to the next display information 51.

If the above-mentioned fourth condition is found to be met, then the control unit 11 establishes a seventh changed display-out time CDOT4 shorter than the first display-out time DOT1 as the display-out time for the current display information 50 being displayed when the instruction input interval is measured. At the same time, the control unit 11 establishes a fourth changed display-in time CDIT4 (i.e., the same as the seventh changed display-out time CDOT4) shorter than the first display-in time DIT1 as the display-in time applicable to the next display information 51. If the fifth condition mentioned above is found to be met, then the control unit 11 establishes an eighth changed display-out time CDOT5 shorter than the seventh changed display-out time CDOT4 as the display-out time for the current display information 50 being displayed when the instruction input interval is measured. At the same time, the control unit 11 establishes a fifth changed display-in time CDIT5 (i.e., the same as the eighth changed display-out time CDOT5) shorter than the fourth changed display-in time CDIT4 as the display-in time applicable to the next display information 51.

Whereas the foregoing explanation was based on the assumption that the second display information changing method is in use, the control unit 11 may adopt the third display information changing method instead and still replace likewise the first display-out time DOT1 with either of the seventh and the eighth changed display-out times CDOT4 and CDOT5, and the first display-in time DIT1 with either of the fourth and the fifth changed display-in times CDIT4 and CDIT5, in keeping with the intervals at which the reproduced music change instruction is input. If the fourth or the fifth display information changing method is selected to be used, then the control unit 11 determines the display-in time in the same manner as described above, selecting either of the fourth and the fifth changed display-in times CDIT4 and CDIT5 replacing the first display-in time DIT1 in accordance with the intervals at which the reproduced music change instruction is input. Using the same method, however, the control unit 11 determines the fade-out reproduction time differently. The control unit 11 selects either the sixth or the seventh changed fade-out reproduction time in keeping with the intervals at which the reproduced music change instruction is input, thereby replacing the second display-out time DOT2 which in turn was selected in place of the first display-out time DOT1 earlier. The sixth and the seventh fade-out reproduction times are set to be progressively shorter than the second display-out time DOT2.

As described, when the user requests to change music data items D1 in a relatively quick manner (i.e., when the input unit 12 is operated comparatively fast), the control unit 11 progressively shortens the interval between the time the changeover is requested and the time the music data items D1 are actually changed (the internal is called the music data changing time). In this manner, the control unit 11 keeps the user from growing impatient at the music data items D1 not being changed as fast as he or she would like. With the music data changing time thus curtailed, the control unit 11 also shortens progressively the time it takes to change from the current display information 50 to the next display information 51 (i.e., information changing time). Thus the control unit 11 keeps the user from getting impatient at the current display information 50 being replaced by the next display information 51 too slowly.

Meanwhile, the control unit 11 may set aside at least one of multiple play lists PL as a particular play list PL. The particular play list PL is set so that its registered music data items D1 will always be reproduced. The other play lists PL may be selected or deselected from reproduction of their music data items D1 by the user actually previewing these music data items.

More specifically, the user may operate the input unit 12 at a given point in time to input a reproduction use setting request instruction requesting to select whether to use a given play list PL for reproduction of its music data items D1. In response, the control unit 11 reads reproduction use setting screen data from the content data storage unit 14 and sends the retrieved data to the display processing unit 17. The display processing unit 17 forwards the reproduction use setting screen data supplied by the control unit 11 to the display unit 18. The display processing unit 17 thus causes the display unit 18 to display a reproduction use setting screen 60 such as one shown in FIG. 18.

Figure 18:
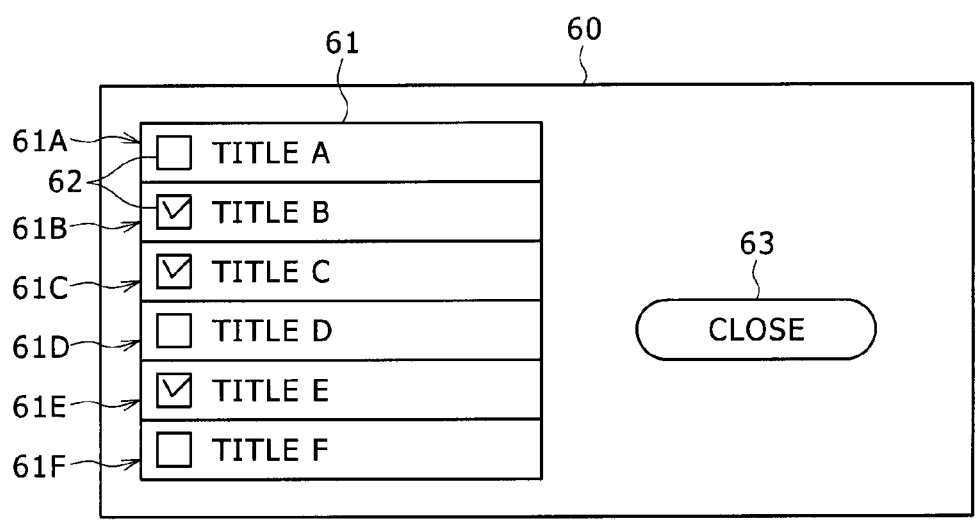
FIG. 18 is a schematic view showing a typical structure of a reproduction use setting screen.

On the reproduction use setting screen of FIG. 18 is a list presentation column 61 displaying a list of presentation fields 61A through 61F presenting a plurality of play lists that may be selected or deselected from reproduction of their music data items D1. In the list presentation column 61, each of the presentation fields 61A through 61F displays the list name of the corresponding play list PL along with a check box 62 that may or may not be selected to use this play list PL for reproduction of its music data items D1. Clicking a check mark into the check box 62 specifies that the corresponding play list PL is to be used for reproduction of its music data items D1; clicking to remove the check mark from the check box 62 specifies that the corresponding play list PL is to be deselected from reproduction of its music data items D1. Also found on the reproduction use setting screen 60 is a set button 63 used to close this screen 60 after the play lists PL have been selected or deselected from reproduction of their music data items D1.

With the reproduction use setting screen 60 displayed on the display unit 18 under control of the display processing unit 17, the user may input a cursor movement instruction by pushing, say, the upward or downward direction selection button RME or RMF on the remote controller RM. In turn, the control unit 11 notifies the display processing unit 17 of the input instruction. In response to the notification from the control unit 11, the display processing unit 17 moves up or down a cursor (not shown) pointing to one of the presentation fields 61A through 61F inside the list presentation column 61 on the reproduction use setting screen 60.

With the cursor pointing to one of the presentation fields 61A through 61F on the reproduction use setting screen 60, the user may push the enter button RMI on the remote controller RM. In that case, the control unit 11 recognizes the input instruction as a reproduction use selection instruction for selecting whether to use the applicable play list PL for reproduction of its music data items D1, and notifies the display processing unit 17 of the recognized instruction. In response to the notification from the control unit 11, the display processing unit 17 puts a check mark into the check box 62 of one of the presentation fields 61A through 61F which is currently pointed by the cursor inside the list presentation column 61 on the reproduction use setting screen 60. Conversely, the display processing unit 17 may receive a reproduction use selection instruction from the control unit 11 while the cursor is pointing to one of the presentation fields 61A through 61F which has the check mark already placed in its check box 62. The input instruction causes the display processing unit 17 to remove the check mark from the check box 62. In this manner, the control unit 11 allows the user to select whether to use a given play list PL for reproduction of its music data items D1, through clicking of a check mark into the corresponding check box 62 or by removal of the check mark therefrom on the reproduction use setting screen 60.

Illustratively, the user may input a rightward direction selection instruction by pushing the rightward direction selection button RMH on the remote controller RM. In turn, the control unit 11 notifies the display processing unit 17 of the input instruction. In response to the notification from the control unit 11, the display processing unit 17 moves the cursor from the list presentation column 61 to the set button 63 on the reproduction use setting screen 60. Conversely, with the cursor positioned on the set button 63, the user may push the leftward direction selection button RMG on the remote controller RM causing the control unit 11 to send a leftward direction selection instruction to the display processing unit 17. In this case, the display processing unit 17 moves the cursor from the set button 63 to the list presentation column 61 on the reproduction use setting screen 60. Then the control unit 11 is again enabled to designate one of the presentation fields 61A through 61F by means of the cursor.

With the cursor positioned on the set button 63, the user may push the enter button RMI on the remote controller RM. In that case, the control unit 11 recognizes the input instruction as a reproduction use setting instruction and notifies the display processing unit 17 of the recognized instruction. In response to the notification from the control unit 11, the display processing unit 17 notifies the control unit of what is being displayed on the reproduction use setting screen 60 and then closes this reproduction use setting screen 60. In this manner, the control unit 11 determines whether to let the individual play lists PL be used for reproduction of their music data items D1 by suitably changing the reproduction use setting information LS held in the play lists PL in response to the notification coming from the display processing unit 11.

When one of the presentation fields 61A through 61F is designated by the cursor on the reproduction use setting screen 60 displayed by the display processing unit 17 on the display unit 18, the control unit 11 reads from the content data storage unit 14 the play list PL corresponding to the cursor-designated presentation field. While one of the presentation fields 61A through 61F is being designated by the cursor, the control unit 11 reads the music data items D1 and data-related information DRE successively from the content data storage unit 14 according to the corresponding play list PL as described above, and sends the retrieved music data items D1 to the reproduction unit 17 together with the specific position information SP included in the relevant data-related information DRE.

Figure 19:
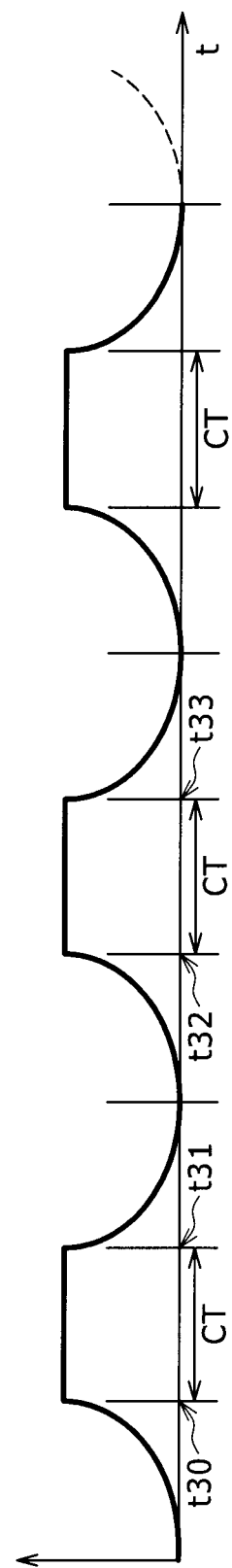
FIG. 19 is a schematic view explanatory of how multiple music data items are reproduced continuously.

In turn, as shown in FIG. 19, the control unit 11 causes the reproduction unit 13 to fade in a given music data item D1A starting from its specific position. Following a fade-in reproduction complete time t30, the control unit 11 controls the reproduction unit 13 to normally reproduce the music data item D1A over a predetermined constant time CT (i.e., a constant time period preceding the ending position). Starting from a time t31 at which the normal reproduction is completed, the control unit 11 causes the reproduction unit 13 to fade out the music data item D1A. Upon completion of the fade-out reproduction of the current music data item D1A, the control unit 11 controls the reproduction unit 13 to fade in the next music data item D1B starting from its specific position. Following a fade-in reproduction complete time t32, the control unit 11 causes the reproduction unit 13 to normally reproduce the music data item D1B over the constant time CT. Starting from a time t33 at which the normal reproduction is completed, the control unit 11 controls the reproduction unit 13 to fade out the music data item D1B.

As described, the control unit 11 enables the user to determine whether to select each play list PL for reproduction of its music data items D1. During the selection, the control unit 11 allows each of a plurality of music data items D1 registered in the play list PL to be reproduced over a predetermined constant time starting from the specific position of the music data item. In this manner, the control unit 11 lets the user actually preview part of the music derived from the music data items D1 registered in each play list PL, allowing the user to determine whether to select the play list PL in question for reproduction of its music data items D1.

Figure 20:
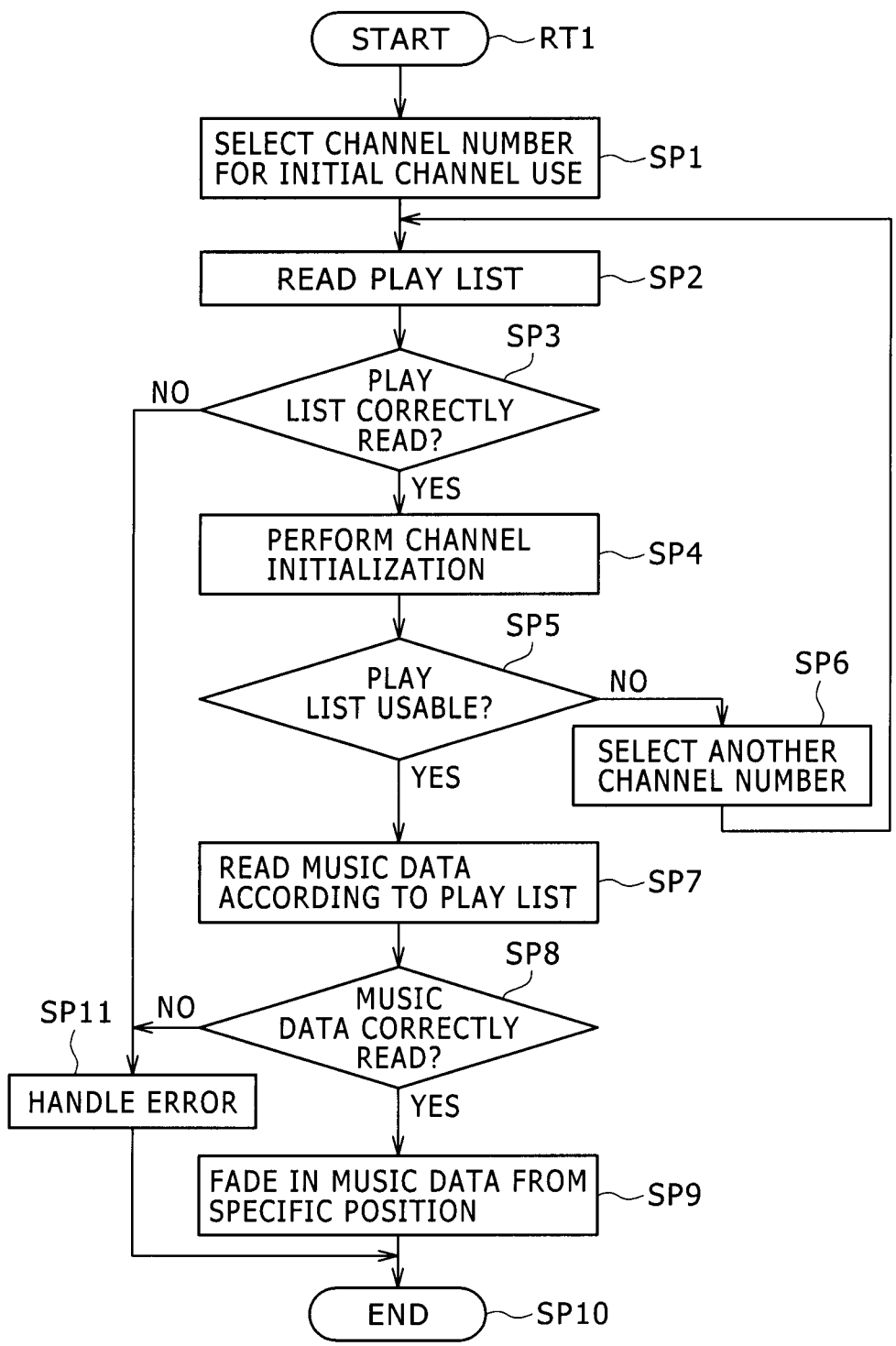
FIG. 20 is a flowchart of steps constituting a list-using reproduction function activating routine.

When the user operates the input unit 12 to select the list-using reproduction function, the control unit 11 activates the list-using reproduction function by starting a list-using reproduction function activating routine RT1 shown in FIG. 20. When the list-using reproduction function activating routine RT1 is started, the control unit 11 goes to step SP1 and selects a channel number for initial channel use. In step SP2, the control unit 11 reads from the content data storage unit 14 a channel list CL and the play list PL allocated to the channel number selected for initial channel use. Step SP2 is followed by step SP3.

In step SP3, the control unit 11 determines whether or not the play list PL is correctly read out. If the result of the check in step SP3 is affirmative, that typically means the data in the play list PL is intact. In that case, the control unit 11 goes to step SP4. In step SP4, the control unit 11 performs a channel initialization process using the play list PL. If the reproduction mode information PM included in the list attribute information LAT of the play list PL indicates shuffle reproduction mode, then the channel initialization process may involve substituting a newly established random sequence of music data items for the currently defined reproduction sequence of the music data items D1 in the play list PL of interest. With the channel initialization process completed, the control unit 11 goes to step SP5.

In step SP5, the control unit 11 determines whether or not the play list PL in question is set to be used for reproduction of its music data items D1 based on the reproduction use setting information LS included in the list attribute information LAT of the play list PL. If the result of the check in step SP5 is negative, that means the play list PL is not to be used for reproduction of its music data items D1. That is, the music data items D1 cannot be reproduced according to the play list PL allocated to the currently selected channel. In this case, the control unit 11 goes step SP6. In step SP6, the control unit 11 selects a particular channel to which the particular play list is allocated. After the selection, the control unit 11 returns to step SP2. The control unit 11 then reads the particular play list PL corresponding to the particular channel and repeats the subsequent steps.

If the result of check in step SP5 is affirmative, that means the play list PL in question can be used for reproduction of its music data items D1. That is, the music data items D1 can be reproduced according to the play list PL allocated to the currently selected channel. In this case, the control unit 11 goes to step SP7.

In step SP7, the control unit 11 reads from the content data storage unit 14 the first music data item D1 in the reproduction sequence of the play list PL. From step SP7, the control unit 11 goes to step SP8 and determines whether or not the music data item D1 is correctly read out. If the result of the check in step SP8 is affirmative, that means the retrieved music data item D1 is intact. The control unit 11 then goes to step SP9 and controls the display processing unit 17 to display the selection screen 20 on the display unit 18. At the same time, the control unit 11 causes the reproduction unit 13 to start reproducing the music data item D1 from its specific position. From step SP9, the control unit 11 goes to step SP10 and terminates the list-using reproduction function activating routine RT1.

In practice, the control unit 11 in step SP9 does not specifically control the display processing unit 17 to fade in the selection screen 20; the control unit 11 causes the display processing unit 17 to normally display the selection screen 20 all at once in synchronism with the start of reproduction of the music data item D1. In this manner, the display unit 11 announces promptly what kind of music will be output as soon as the music data item D1 starts getting reproduced from its specific position.

In step SP9, the control unit 11 causes the reproduction unit 13 to fade in the music data item D1 starting from its specific position. With the fade-in reproduction completed, the control unit 11 lets the reproduction unit 13 effect transition to normal reproduction. The specific position of the music data item D1 might have an inordinately high data level compared with the starting position of the same data item. For that reason, when the music data item D1 is reproduced from its specific position for the first time after activation of the list-using reproduction function, the control unit 11 works to avert the possibility of having the music data item D1 abruptly reproduced at full volume.

If the result of the check in step SP3 is negative, that means the data items in the play list PL have been destroyed. In that case, the control unit 11 goes to step SP11. If the result of the check in step SP8 is negative, that means the retrieved music data item D1 has been destroyed. If that is the case, the control unit 11 also goes to step SP11. In step SP11, the control unit 11 performs error handling, illustratively informing the user that the music data item D1 cannot be reproduced. From step SP11, the control unit 11 goes to step SP10. In the manner described above, the control unit 11 activates the list-using reproduction function.

Figure 21:
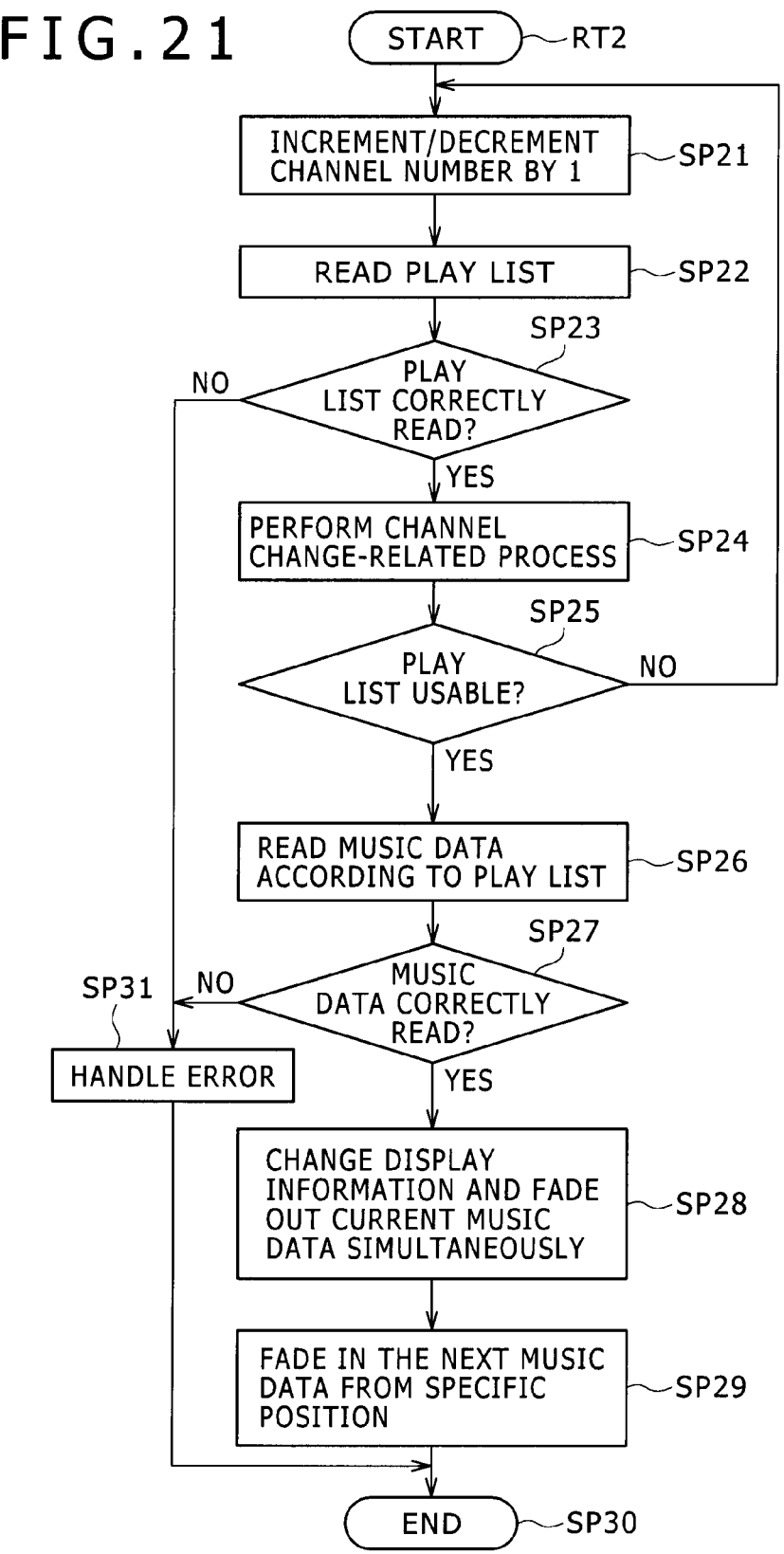
FIG. 21 is a flowchart of steps constituting a channel changing routine.

What follows is an explanation of a channel changing process carried during activation of the list-using reproduction function. While the list-using reproduction function is being active, the user may input a channel change instruction by operating the input unit 12. In that case, the control unit 11 starts up a channel changing routine RT2 shown in FIG. 21. With the channel changing routine RT2 started, the control unit 11 goes to step SP21 and increments or decrements by "1" the channel number CN of the currently selected channel in keeping with the sequence of the channel numbers CN registered in the channel list CL and according to the user-designated direction in which the channel numbers CN are to be changed. The control unit 11 regards the channel of the incremented or decremented channel number CN as the newly changed channel, before going to step SP22. In step SP22, the control unit 11 reads from the content data storage unit 14 the play list PL allocated to the newly changed channel. From step SP22, the control unit 11 goes to step SP23.

In step SP23, the control unit 11 determines whether or not the play list PL is correctly read out. If the result of the check in step SP23 is affirmative, that means the data in the play list PL is intact. In that case, the control unit 11 goes to step SP24 and performs a channel change-related process.

If the reproduction mode information PM included in the list attribute information LAT of the play list PL indicates shuffle reproduction mode, then the channel change-related process performed by the control unit 11 in step SP24 may involve substituting a newly established random sequence of music data items for the currently defined reproduction sequence of the music data items D1 in the play list PL of interest. With the channel change-related process completed, the control unit 11 goes to step SP25.

In step SP25, the control unit 11 determines whether or not the play list PL in question is set to be used for reproduction of its music data items D1 based on the reproduction use setting information LS included in the list attribute information LAT of the play list PL. If the result of the check in step SP25 is negative, that means the play list PL is not to be used for reproduction of its music data items D1. That is, the music data items D1 cannot be reproduced according to the play list PL allocated to the currently selected channel. In this case, the control unit 11 returns to step SP21. In step SP21, the control unit 11 again increments or decrements by "1" the channel number CN of the channel corresponding to the play list PL and regards the channel of the incremented or decremented channel number CN as the newly changed channel. The subsequent steps are then repeated.

If the result of the check in step SP25 is affirmative, that means the play list PL in question can be used for reproduction of its music data items D1. That is, the music data items D1 can be reproduced according to the play list PL allocated to the currently selected channel. In this case, the control unit 11 goes to step SP26.

In step SP26, the control unit 11 reads from the content data storage unit 14 the first music data item D1 in the reproduction sequence of the play list PL allocated to the newly changed channel. From step SP26, the control unit 11 goes to step SP27 and determines whether or not the music data item D1 is correctly read out. If the result of the check in step SP27 is affirmative, that means the retrieved music data item D1 is intact. The control unit 11 then goes to step SP28.

In step SP28, the control unit 11 controls the display processing unit 17 to replace the current display information 50 with the next display information 51 on the display unit 18 through the use of one of the first through the fifth display information changing method which was selected upon activation of the list-using reproduction function. At the same time, the control unit 11 causes the reproduction unit 13 to fade out the currently reproduced music data item D1 over the first or the second fade-out reproduction time FOT1 or FOT2 in accordance with one of the first through the fourth music data changing methods which was selected upon activation of the list-using reproduction function. With the fade-out reproduction completed, the control unit 11 goes to step SP29. In step SP29, the control unit 11 controls the reproduction unit 13 to fade in the music data item D1 corresponding to the changed channel (i.e., the next music data item D1) starting from the specific position (over the first fade-in reproduction time FIT1) according to one of the first through the fourth music data changing methods which was selected upon activation of the list-using reproduction function. With the fade-in reproduction started, the control unit 11 goes to step SP30 and terminates the channel changing routine RT2.

If the result of the check in step SP23 is negative, that typically means the data in the play list PL has been destroyed. In that case, the control unit 11 goes to step SP31. If the result of the check in step SP27 is negative, that typically means the music data item D1 has been destroyed. In this case, the control 11 also goes to step SP31. In step S31, the control unit 11 performs error handling, illustratively informing the user that the music data item D1 cannot be reproduced. From step SP31, the control unit 11 goes to step SP30. The control unit 11 thus changes channels as requested by the user during activation of the list-using reproduction function.

Figure 22:
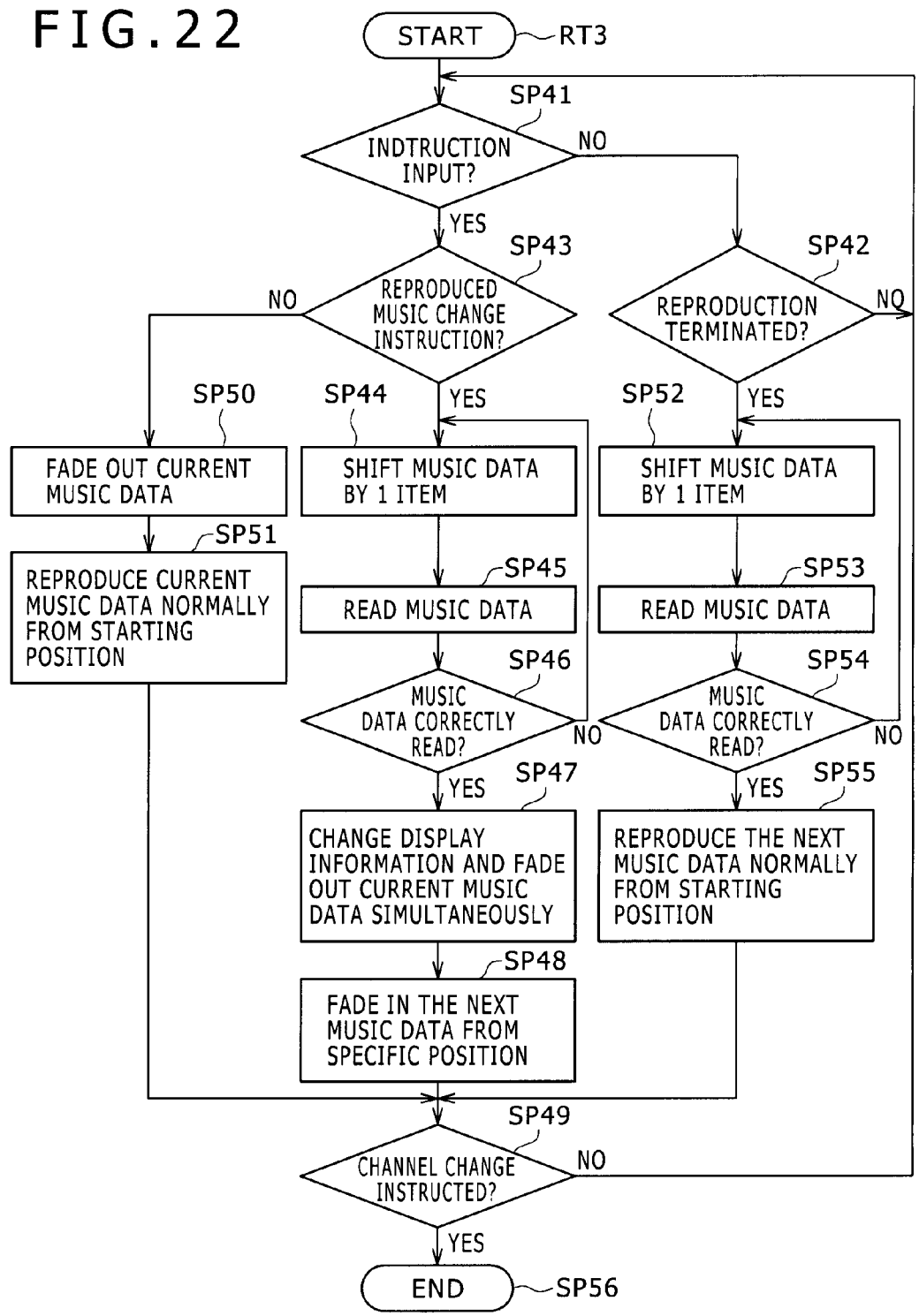
FIG. 22 is a flowchart of steps constituting a reproduction changing routine.

Described below is a reproduction changing process performed during activation of the list-using reproduction function. The control unit 11 starts fading in a music data item D1 from its specific position following retrieval from the content data storage unit 14, the data item D1 being the first in the reproduction sequence of the play list PL allocated to the newly changed channel. With the fade-in reproduction initiated, the control unit 11 starts up a reproduction changing routine RT3 shown in FIG. 22 and goes to step SP41. In step SP41, the control unit 11 determines whether or not one of a reproduced music change instruction and a music selection finalizing instruction is input by the user operating the input unit 12. If the result of the check in step SP41 is negative, that means the music derived from the currently reproduced music data item D1 is being listened to by the user. In that case, the control unit 11 goes to step SP42.

In step SP42, the control unit 11 determines whether or not the currently reproduced music data D1 has come to an end. If the result of the check in step SP42 is negative, that means the music data item D1 is still being reproduced. If that is the case, the control unit 11 goes back to step SP41. Thereafter the control unit 11 repeats steps SP41 and SP42 until the result of the check in one of these two steps becomes affirmative. In this manner, the control unit 11 waits until one of the reproduced music change instruction and the music selection finalizing instruction is input by the user operating the input unit 12 or until the reproduction of the music data item D1 comes to an end.

If the result of the check in step SP41 is affirmative, that means the user has requested to change the music data items D1 to be reproduced or has finalized the selection of the currently reproduced music data item D1 as the preferred music data item D1. In that case, the control unit 11 goes to step SP43 and checks to determine whether the instruction input through the input unit 12 is the reproduced music change instruction. If the result of the check in step SP43 is affirmative, that means the user has requested to change the music data items D1. In this case, the control unit 11 goes to step SP44.

In step SP44, the control unit 11 shifts from the currently reproduced music data item D1 one item backward or forward in keeping with the sequence of the content designation information items MID registered in the currently selected play list PL (in keeping with the changed sequence if shuffle reproduction mode is designated) and according to the user-designated direction in which the music data items are to be changed. The control unit 11 regards the newly reached data item as the newly changed music data item D1, before going to step SP45. In step SP45, the control unit 11 reads the newly changed music data item D1 from the content data storage unit 14. The control unit 11 then goes to step SP46.

In step SP46, the control unit 11 checks to determine whether the newly changed music data item D1 is correctly read out. If the result of the check in step SP46 is negative, that typically means the newly changed music data item D1 has been destroyed. That is, the retrieved music data item D1 cannot be reproduced. If that is the case, the control unit 11 returns to step SP44. This time in step SP44, the control unit 11 shifts from the currently reproduced music data item D1 two items forward or backward and regards the newly reached data item as the newly changed music data item D1 (except for the music data items D1 not set to be reproduced). The subsequent steps are then repeated.

If the result of the check in step SP46 is affirmative, that typically means the newly changed music data item D1 is intact. That is, the retrieved music data item D1 can be reproduced with no problem. In this case, the control unit 11 goes to step SP47. In step SP47, the control unit 11 controls the display processing unit 17 to replace the current display information 50 with the next display information 51 on the display unit 18 through the use of one of the first through the fifth display information changing method which was selected upon activation of the list-using reproduction function. At the same time, the control unit 11 causes the reproduction unit 13 to fade out the currently reproduced music data item D1 over the first or the second fade-out reproduction time FOT1 or FOT2 in accordance with one of the first through the fourth music data changing methods which was selected upon activation of the list-using reproduction function. With the fade-out reproduction completed, the control unit 11 goes to step SP48.

In step SP48, the control unit 11 controls the reproduction unit 13 to fade in the newly changed music data item D1 (i.e., the next music data item D1) starting from its specific position (over the first fade-in reproduction time FIT1) according to one of the first through the fourth music data changing methods which was selected upon activation of the list-using reproduction function. With the fade-in reproduction started, the control unit 11 goes to step SP49 and checks to determine whether a channel change instruction is input through the input unit 12. If the result of the check in step SP49 is negative, that means the user has requested to reproduce the music data items D1 according to the currently selected play list PL and that no request has been made to change channels. If that is the case, the control unit 11 returns to step SP41.

If the result of the check in step SP43 is negative, that means the music data item D1 currently reproduced starting from its specific position has been selected as the preferred music data item D1. In that case, the control unit 11 goes to step SP50. In step SP50, the control unit 11 controls the display processing unit 17 to replace the reproduction screen 40 with the selection screen 20 on the display unit 18 through the use of one of the first through the fifth display information changing method which was selected upon activation of the list-using reproduction function. At the same time, the control unit 11 causes the reproduction unit 13 to fade out the currently reproduced music data item D1 starting from its specific position over the first or the second fade-out reproduction time FOT1 or FOT2 in accordance with one of the first through the fourth music data changing methods which was selected upon activation of the list-using reproduction function. With the fade-out reproduction completed, the control unit 11 goes to step SP51. In step SP51, the control unit 11 controls the reproduction unit 13 to normally reproduce from the beginning the music data item D1 that has just been faded out. From step SP51, the control unit 11 goes to step SP49.

If the result of the check in step SP42 is affirmative, that means the user has listened to the currently reproduced music data item D1 to the end, i.e., that the reproduction of the music data item D1 in question has been completed uninterrupted. In that case, the control unit 11 goes to step SP52 and shifts to the data item (except for the music data items D1 not set to be reproduced) next to the music data item D1 of which the reproduction has just ended, in keeping with the sequence of the content designation information items MID registered in the currently selected play list PL (in keeping with the changed sequence if shuffle reproduction mode is designated). The control unit 11 regards the newly reached data item as the newly changed music data item D1, before going to step SP53. In step SP53, the control unit 11 reads the newly changed music data item D1 from the content data storage unit 14. The control unit 11 then goes to step SP54.

In step SP54, the control unit 11 determines whether or not the newly changed music data item D1 is correctly read out. If the result of the check in step SP54 is negative, that typically means the changed music data item D1 has been destroyed. That is, the retrieved music data item D1 cannot be reproduced. In that case, the control unit 11 returns to step SP52 and shifts to the data item (except for the music data items D1 not set to be reproduced) next to the currently reached music data item D1. The control unit 11 regards the newly reached data item as the newly changed music data item D1, and repeats the subsequent steps.

If the result of the check in step SP54 is affirmative, that typically means the newly changed music data item D1 is intact. That is, the retrieved music data item D1 can be reproduced with no problem. The control unit 11 then goes to step SP55 and controls the display processing unit 17 to replace the current display information 50 as the selection screen 20 with the next display information 51 as the reproduction screen 40 on the display unit 18. At the same time, the control unit 11 causes the reproduction unit 13 to normally reproduce the newly changed music data item D1 from the beginning. From step SP55, the control unit 11 goes to step SP49.

Thereafter, the control unit 11 repeats the subsequent steps until the result of the check in step SP49 becomes affirmative. Carrying out the above steps permits successive reproduction of a plurality of music data items D1 registered in the play list PL. If the result of the check in step SP49 is affirmative, that means the user has requested to change channels in order to change play lists PL. If that is the case, the control unit 11 goes to step SP56 and terminates the reproduction changing routine RT3.

Figure 23:
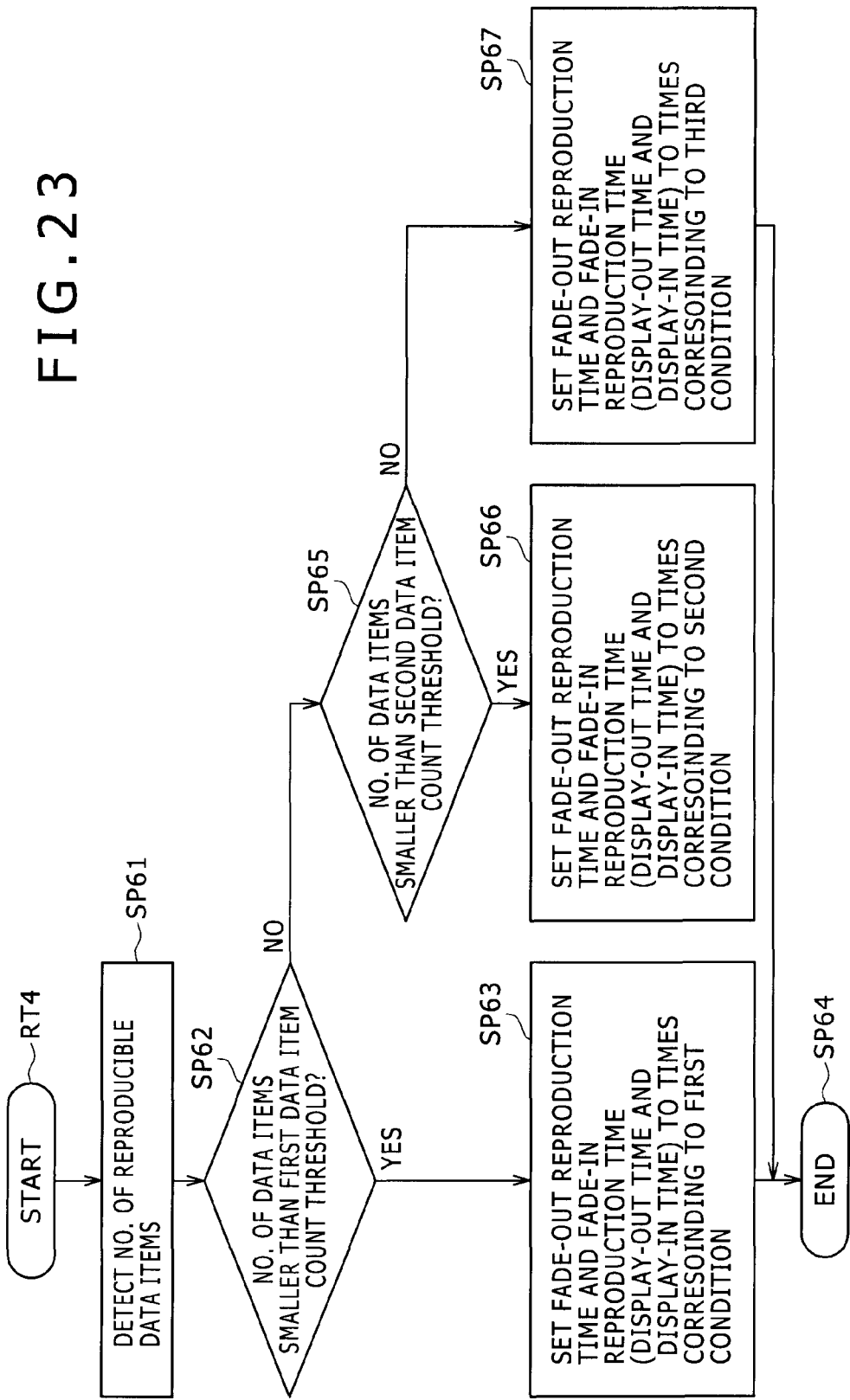
FIG. 23 is a flowchart of steps constituting a time setting routine.

What follows is a description of how a time setting process is carried out to shorten the first and the second fade-out reproduction times FOT1 and FOT2 and the first fade-in reproduction time FIT1 according to the first control method and in keeping with the intervals at which the reproduced music change instruction is input. The control unit 11 reads a play list PL from the content data storage unit 14 upon channel change and starts up a time setting routine RT4 shown in FIG. 23. With the time setting routine RT4 started, the control unit 11 goes to step SP61 and detects the number of reproducible data items corresponding to the retrieved play list PL. From step SP61, the control unit 11 goes to step SP62.

In step SP62, the control unit 11 compares the reproducible data item count with the first data item count threshold. Based on the comparison, the control unit 11 determines whether or not the reproducible data item count is smaller than the first data item count threshold. If the result of the check in step SP62 is affirmative, that means the number of the music data items D1 set to be produced in the play list PL is relatively small. If that is the case, the control unit 11 goes to step SP63. In step SP63, the control unit 11 sets the fade-out reproduction time to either the first or the fourth changed fade-out reproduction time CFOT1 and the fade-in reproduction time to the first changed fade-in reproduction time CFIT1 according to the first condition indicating that the reproducible data item count is smaller than the first data item count threshold, the fade-out and fade-in reproduction times being used for the change of music data items D1 during reproduction. After step SP63, the control unit 11 goes to step SP64 and terminates the time setting routine RT4. Where one of the second through the fifth display information changing methods is selected to be used, the control unit 11 in step SP63 sets the display-out time to either the first or the fourth changed display-out time CDOT1 and the display-in time to the first changed display-in time CDIT1 according to the first condition, the display-out and display-in times being used for the change of display information.

If the result of the check in step SP62 is negative, that means the number of the music data items D1 set to be reproduced in the play list PL is relatively large. In that case, the control unit 11 goes to step SP65. In step SP65, the control unit 11 compares the reproducible data item count with the second data item count threshold. Based on the comparison, the control unit 11 determines whether or not the reproducible data item count is equal to or larger than the first data item count threshold and smaller than the second data item count threshold. If the result of the check in step SP65 is affirmative, that means a fairly large number of music data items D1 are set to be reproduced in the play list PL. If that is the case, the control unit 11 goes to step SP66. In step SP66, the control unit 11 sets the fade-out reproduction time to either the second or the fifth changed fade-out reproduction time CFOT2 and the fade-in reproduction time to the second changed fade-in reproduction time CFIT2 according to the second condition indicating that the reproducible data item count is equal to or larger than the first data item count threshold and smaller than the second data item count threshold, the fade-out and fade-in reproduction times being used for the change of music data items D1 during reproduction. After step SP66, the control unit 11 goes to step SP64 and terminates the time setting routine RT4. Where one of the second through the fifth display information changing methods is selected to be used, the control unit 11 in step SP66 sets the display-out time to either the second or the fifth changed display-out time CDOT2 and the display-in time to the second changed display-in time CDIT2 according to the second condition, the display-out and display-in times being used for the change of display information.

If the result of the check in step SP65 is negative, that means a large number of music data items D1 are set to be reproduced in the play list PL. In that case, the control unit 11 goes to step SP67. In step SP67, the control unit 11 sets the fade-out reproduction time to either the third or the sixth changed fade-out reproduction time CFOT3 and the fade-in reproduction time to the third changed fade-in reproduction time CFIT3 according to the third condition indicating that the reproducible data item count is equal to or larger than the second data item count threshold, the fade-out and fade-in reproduction times being used for the change of music data items D1 during reproduction. After step SP67, the control unit 11 goes to step SP64 and terminates the time setting routine RT4. Where one of the second through the fifth display information changing methods is selected to be used, the control unit 11 in step SP67 sets the display-out time to either the third or the sixth changed display-out time CDOT3 and the display-in time to the third changed display-in time CDIT3 according to the third condition, the display-out and display-in times being used for the change of display information.

In the manner described above, when the user quickly operates the input unit 12 in order to request a change of music data items D1, the control unit 11 effects the change just as quickly by fading out the currently reproduced music data D1A over one of the first through the sixth changed fade-out reproduction times CFOT1 through CFOT3 and by fading in the next data item D1B over one of the first through the third changed fade-in reproduction times CFIT1 through CFIT3, the fade-out and fade-in times being selected in accordance with the number of the music data items D1 registered in the play list PL. Where one of the second through the fifth display information changing methods is selected to be used, the control unit 11 also effects a rapid change of display information by fading out the current display information 50 over one of the first through the sixth changed display-out times CDOT1 through CDOT3 and by fading in the next display information 51 over one of the first through the third changed display-in times CDIT1 through CDIT3, the fade-out and fade-in times being selected according to the number of the music data items D1 registered in the play list PL.

Figure 24:
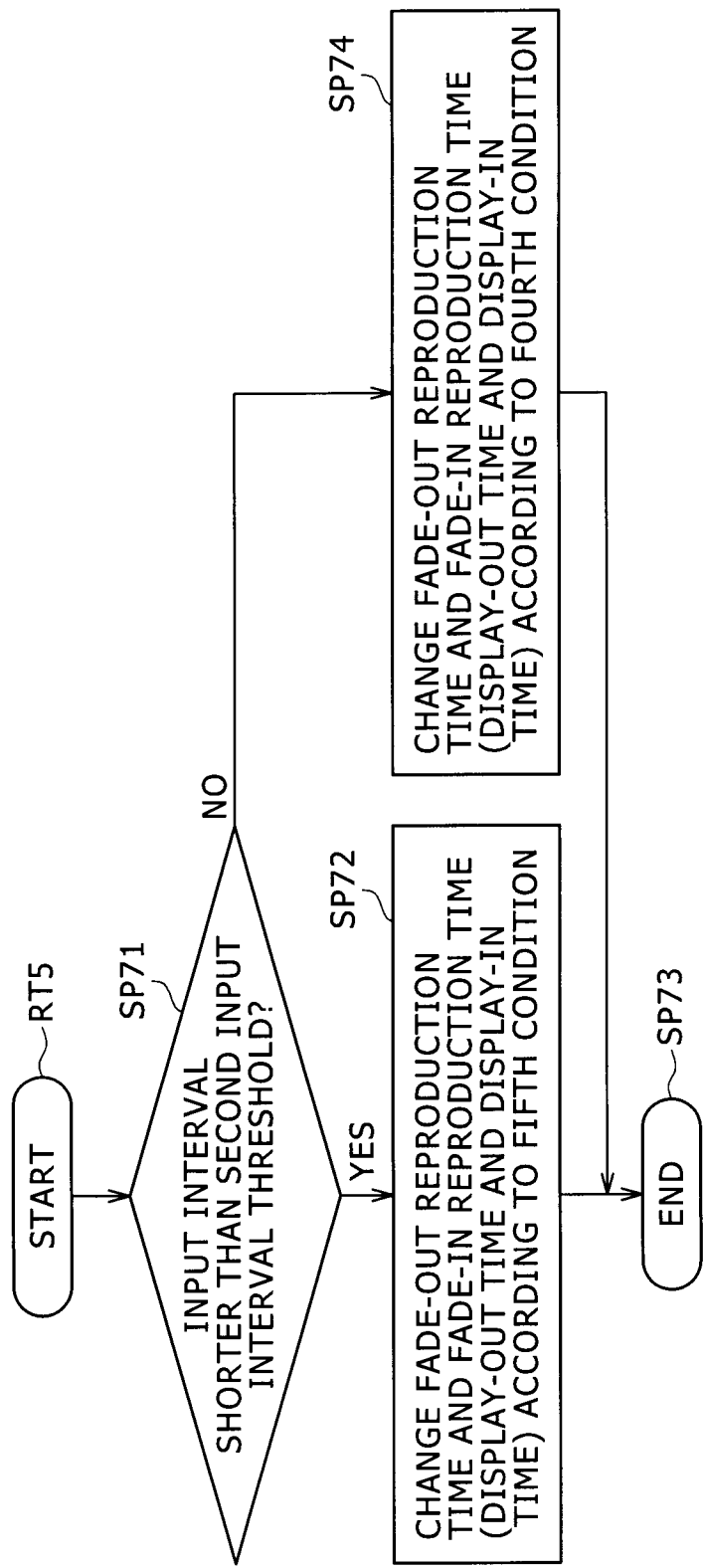
FIG. 24 is a flowchart of steps constituting a time changing routine.

What follows is an explanation of how a time changing process is carried out to shorten the first and the second fade-out reproduction times FOT1 and FOT2 and the first fade-in reproduction time FIT1 according to the second control method and in keeping with the intervals at which the reproduced music change instruction is input. With a play list PL retrieved from the content data storage unit 14 and with a music data item D1 currently reproduced according to the play list PL, the control unit 11 starts up a time changing routine RT5 shown in FIG. 24 if the next reproduced music change instruction is input quickly, i.e., at an instruction input interval shorter than the first instruction input interval threshold.

With the time changing routine RT5 started, the control unit 11 goes to step SP71 and compares the interval between the time the preceding reproduced music change instruction was input and the time the current reproduced music change instruction is input, with the second instruction input interval threshold. Based on the comparison, the control unit 11 determines whether or not the instruction input interval is shorter than the second instruction input interval threshold. If the result of the check in step SP71 is negative, that means the user has operated the input unit 12 in an appreciably quick manner so as to request a change of music data items D1. If that is the case, the control unit 11 goes to step SP72. In step SP72, the control unit 11 sets the fade-out reproduction time to either the eighth or a tenth changed fade-out reproduction time CFOT5 and the fade-in reproduction time to the fifth changed fade-in reproduction time CFIT5 according to the fifth condition indicating that the instruction input interval is shorter than the second instruction input interval threshold, the fade-out and fade-in reproduction times being used for the change of music data items D1 during reproduction. After step SP72, the control unit 11 goes to step SP73 and terminates the time changing routine RT5. Where one of the second through the fifth display information changing methods is selected to be used, the control unit 11 in step SP72 sets the display-out time to either the eighth or a tenth changed display-out time CDOT5 and the display-in time to the fifth changed display-in time CDIT5 according to the fifth condition, the display-out and display-in times being used for the change of display information.

If the result of the check in step SP71 is negative, that means the user has operated the input unit 12 in a relatively quick manner so as to request a change of music data items D1. If that is the case, the control unit 11 goes to step SP74. In step SP74, the control unit 11 sets the fade-out reproduction time to either the seventh or a ninth changed fade-out reproduction time CFOT4 and the fade-in reproduction time to the fourth changed fade-in reproduction time CFIT4 according to the fourth condition indicating that the instruction input interval is equal to or longer than the second instruction input interval threshold and shorter than the first instruction input interval threshold, the fade-out and fade-in reproduction times being used for the change of music data items D1 during reproduction. After step SP74, the control unit 11 goes to step SP73 and terminates the time changing routine RT5. Where one of the second through the fifth display information changing methods is selected to be used, the control unit 11 in step SP74 sets the display-out time to either the seventh or a ninth changed display-out time CDOT4 and the display-in time to the fourth changed display-in time CDIT4 according to the fourth condition, the display-out and display-in times being used for the change of display information.

As described above, when the user quickly operates the input unit 12 in order to request a change of music data items D1, the control unit 11 effects the change just as quickly by fading out the currently reproduced music data D1A over one of the seventh through the tenth changed fade-out reproduction times CFOT4 or CFOT5 and by fading in the next data item D1B over one of the fourth and the fifth changed fade-in reproduction times CFIT4 or CFIT5, the fade-out and fade-in times being selected in proportion to how quickly the user has operated the input unit 12. Where one of the second through the fifth display information changing methods is selected to be used, the control unit 11 also effects a rapid change of display information by fading out the current display information 50 over one of the seventh through the tenth changed display-out times CDOT4 or CDOT5 and by fading in the next display information 51 over one of the fourth and the fifth changed display-in times CDIT4 or CDIT5, the fade-out and fade-in times being selected in proportion to how quickly the user has operated the input unit 12.

Figure 25:
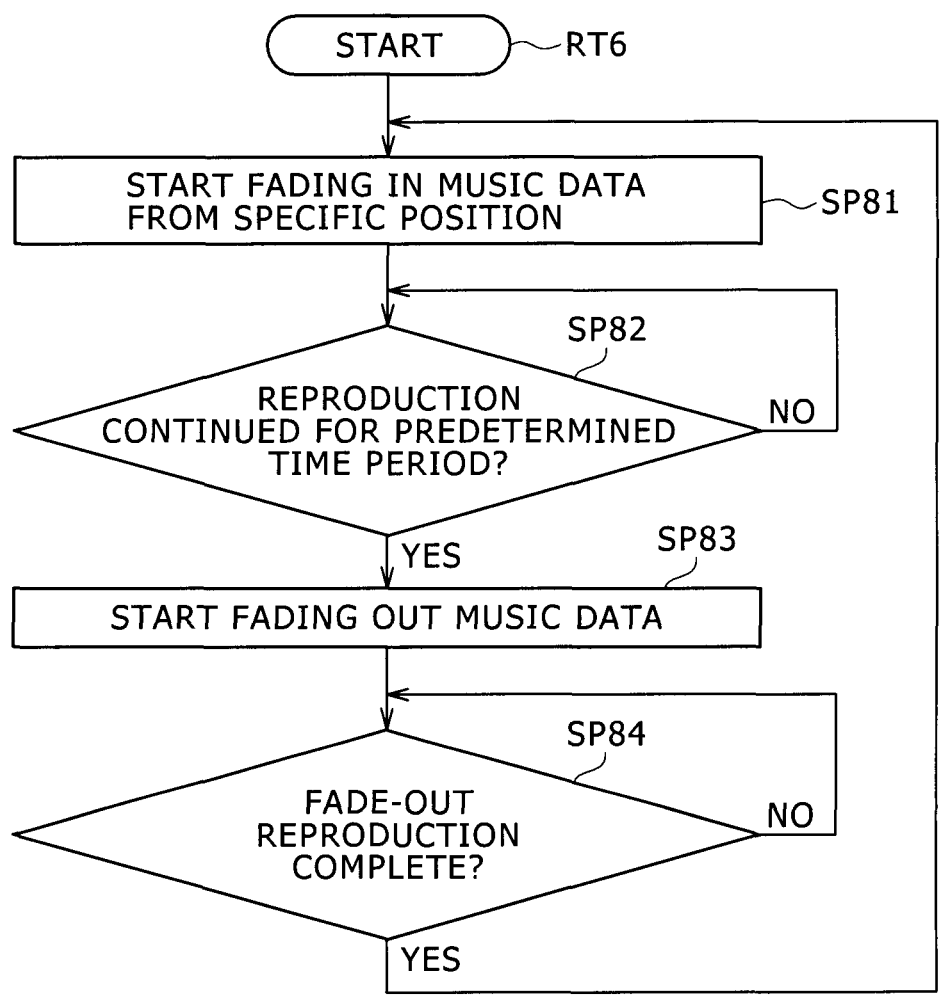
FIG. 25 is a flowchart of steps constituting a continuous reproduction routine.

What follows is a description of a continuous reproduction process that is carried out to successively reproduce a plurality of music data items D1 registered in a given play list PL when the user is prompted to select whether to use that play list PL for reproduction of its music data items D1. With the reproduction use setting screen 60 displayed on the display unit 18 under control of the display processing unit 17, the user may operate the input unit 12 to designate the play list PL of interest. In response, the control unit 11 reads the designated play list PL from the content data storage unit 14. The control unit 11 proceeds to read the first music data item D1 in order of reproduction from the play list PL and starts up a continuous reproduction routine RT6 shown in FIG. 25. The control unit 11 executes the continuous reproduction routine RT6 in parallel with the process of reading a plurality of music data items D1 from the content data storage unit 14 in accordance with the play list PL.

With the continuous reproduction routine RT6 started, the control unit 11 goes to step SP81 and controls the reproduction unit 13 to fade in the just-retrieved music data item D1A starting from its specific position. From step SP81, the control unit 11 goes to step SP82. In step SP82, the control unit 11 checks to determine whether normal reproduction of the music data item D1 has lasted for a predetermined constant time CT following completion of the fade-in reproduction. If the constant time CT is found to have elapsed during normal reproduction of the music data item D1, the control unit 11 goes to step SP83.

In step SP83, the control unit 11 causes the reproduction unit 13 to start fading out the music data item D1 upon elapse of the normal reproduction over the constant time CT subsequent to the completion of the fade-in reproduction. From step SP83, the control unit 11 goes to step SP84. In step SP84, the control unit 11 checks to determine whether the reproduction unit 13 has completed the fade-out reproduction of the music data item D1. If the fade-out reproduction of the music data item D1 is found complete, the control unit 11 returns to step SP81.

As described, as long as the play list PL is kept designated by the user having operated the input unit 12 on the reproduction use setting screen 60 displayed on the display unit 18 under control of the display processing unit 17, the control unit 11 cyclically repeats the continuous reproduction routine RT6 while successively reading the music data items D1 from the content data storage unit 14 according to the play list PL of interest. In this manner, the control unit 11 allows the user to select whether or not to use the play list PL for reproduction of its music data items D1 while letting the user actually preview part of the music derived from the music data items D1 registered in the play list PL.

(1-3) Operations and Effects

With the above-described arrangements in place, the user may select the play list PL as the channel by operating the input unit 12. In that case, the reproducing apparatus 10 fades in a given music data item D1A in accordance with the selected play list PL. At the end of the fade-in reproduction, the reproducing apparatus 10 continuously reproduces the music data item D1A normally. Before the normal reproduction of the music data item D1A is terminated, the user may input a reproduced music change instruction by operating the input unit 12. In such a case, the reproducing apparatus 10 fades out the currently reproduced music data item D1A. Upon completion of the fade-out reproduction, the reproducing apparatus 10 fades in the next music data item D1B in accordance with the play list PL. At the end of the fade-in reproduction, the reproducing apparatus 10 continuously reproduces the music data item D1B normally. In this manner, the reproducing apparatus 10 reproduces a plurality of music data items D1 one after another starting from their specific positions according to the play list PL in which they are registered, every time the user inputs a reproduced music change instruction by operating the input unit 12. The reproducing apparatus 10 thus allows the user continuously to preview part of the music stemming from these multiple music data items D1.

If a given music data D1A reproduced starting from its specific position was continuously reproduced normally and has come to its ending position, with no reproduced music change instruction input halfway by the user operating the input unit 12, then the reproducing apparatus 10 normally reproduces the next music data item D1B from the beginning according to the play list PL. That is, with the music data items D1 reproduced one after another starting from their specific positions according to the play list PL as desired by the user for preview through partial music reproduction, the user may request to have a continuous and full reproduction of the music data items D1 as a whole starting from a given point in time. In that case, the reproducing apparatus 10 can shift easily from partial reproduction of the current music data item D1A to full reproduction of the next music data item D1B with no specific instruction issued to trigger the full reproduction of the data item D1B (i.e., the user need only refrain from inputting the reproduced music change instruction).

With the above arrangements in place, the reproducing apparatus 10 starts fading in a given music data item D1A from its specific position when a reproduced music change instruction is input through the input unit 12. With no further instruction input, the partial reproduction of the music data item D1A shifts to normal reproduction upon completion of the fade-in reproduction and comes to the ending position. At this point, the reproducing apparatus 10 starts normal reproduction of the next music data item D1B from the beginning. That is, when a request is made to fully reproduce a plurality of music data items D1 halfway through their partial reproduction starting from their specific positions, the reproducing apparatus 10 can easily shift from partial reproduction of the current music data item D1B to full reproduction of the next music data item D1B with no particular instruction issued to initiate the full reproduction. The reproducing apparatus 10 thus allows the user easily to enjoy full reproduction of the next music data item following partial reproduction of the current music data item.

When a reproduced music change instruction is input by the user operating the input unit 12, the reproducing apparatus 10 reproduces the current music data item D1A starting from its specific position. If another reproduced music change instruction is input by the user operating the input unit 12 before the reproduction of the current music data item D1A is terminated, then the reproducing apparatus 10 stops reproducing the current music data item D1A and starts reproducing the next music data item D1 from its specific position. The reproducing apparatus 10 thus allows the user continuously to preview a plurality of music data items D1 starting from their specific positions, whereby the user can verify what sort of music these data items D1 provide when reproduced (i.e., the user can determine whether the resulting music matches or is close to the user's preferences). Every time the user requests to change music data items D1, the reproducing apparatus 10 changes from one data item D1 to another for partial reproduction of their specific portions for a desired period of time, thus enabling the user unfailingly to determine whether these data items constitute the preferred music.

When changing music data items D1 in response to the user's request, the reproducing apparatus 10 fades out the currently reproduced music data item D1A. Upon completion of the fade-out reproduction, the reproducing apparatus 10 fades in the next music data item D1B starting from its specific position. At the end of the fade-in reproduction, the reproducing apparatus 10 shifts continuously to normal reproduction of the music data item D1B. These steps forestall the possibility of discomforting the user by letting the music of the currently reproduced music data item D1A be abruptly turned off and the music of the next music data item D1B be suddenly output at full volume. When changing music data items D1 as requested by the user, the reproducing apparatus 10 may be arranged to use the third or the fourth music data changing method so as to make the second fade-out reproduction time FOT2 longer than the first fade-in reproduction time FIT1. With this arrangement, the reproducing apparatus 10 allows the user to linger on the currently reproduced music data item D1A while letting the next music data be turned up in a relatively short time so that the user will not become impatient waiting for the next music data to be turned up at leisure.

Also when changing music data items D1 in response to the user's request, the reproducing apparatus 10 may be arranged to use the second or the fourth music data changing method. According to the method, the reproducing apparatus 10 effects so-called cross fade whereby an ending portion of the currently reproduced music data item D1A being faded out is made to overlap with a starting portion of the next music data item D1B being faded in. As opposed to the case where the first and the second fade-out reproduction times FOT1 and FOT2 and the second fade-in reproduction time FIT1 are predetermined with cross fade not in effect, the reproducing apparatus 10 performing cross fade can shorten the music data changing time DCT1 or DCT4 between the time the fade-out reproduction is started and the time fade-in reproduction is completed. The time required to accomplish the change of music data items D1 can thus be curtailed. Because parts of the fading-out and fading-in music data items are made to overlap with one another when cross fade is carried out, the reproducing apparatus 10 can also inform the user of the change of music data items D1 through the overlapping sound.

Also when changing music data items D1 in response to the user's request, the reproducing apparatus 10 may replace the current display information 50 about the currently reproduced music data item D1A with the next display information 51 about the next music data item D1B on the display unit 18 while fading out the currently reproduced music data item D1A. Thus upon switching music data items D1 as requested by the user, the reproducing apparatus 10 may take some time shifting from normal reproduction of the current music data item D1A to normal reproduction of the next music data item D1B through fade-out and fade-in reproduction but can reliably indicate the change of music data items D1 by replacing the display information. Because the change of the display information is completed while the currently reproduced music data item D1A is still being faded out, the reproducing apparatus 10 can avoid letting the user mistake the music of the current music data item D1A, composed to have distinct drops in volume during reproduction, for a change of music data items D1.

During reproduction of the music data item D1A starting from its specific position, the user may input through the input unit 12 a music selection finalizing instruction to finalize the selection of the currently reproduced music data item D1A as the preferred music data item D1. In that case, the reproducing apparatus 10 fades out the currently reproduced music data item D1A and, upon completion of the fade-out reproduction, starts normally reproducing the same music data item D1A from the beginning. That is, the reproducing apparatus 10 allows the user continuously to preview part of a plurality of music data items D1. When the user decides on the currently reproduced music data item as the preferred music data item, the reproducing apparatus 10 enables the user to listen to the same music data from the beginning. In this manner, the reproducing apparatus 10 lets the user continuously preview part of a plurality of music data items to verify what kind of music each of the individual music data items makes up. When the user selects a given data item as the preferred music data item, the user is allowed to listen to the selected data item normally from the beginning.

The reproducing apparatus 10 has a plurality of play lists PL stored in the content data storage unit 14, each play list having multiple music data items D1 registered and arranged therein by the search based on preselected keywords. The reproducing apparatus 10 prompts the user to select one of the play lists PL to narrow down the range of preferable music data items D1 more or less. After letting the user preview part of each of the music data items D1 registered in the selected play list PL, the reproducing apparatus 10 allows the user to select the preferred music data item. When the user inputs through the input unit 12 a channel change instruction to change play lists PL, the reproducing apparatus 10 acquires the newly selected play list and fades in each of the registered music data items D1 therein starting from their specific positions. That is, upon change of play lists PL, the reproducing apparatus 10 also lets the user preview part of each of the music data items D1 registered in the newly changed play list PL for verification of the data items D1 over a relatively short time.

(1-4) Variations of the Embodiment

In the above-described first embodiment with the third or the fourth music data changing method in use, the first fade-in reproduction time FIT1 was shown set to about 500 msec and the second fade-out reproduction time FOT2 to about 750 msec. Alternatively, the fade-out reproduction time may be set to be longer than the fade-in reproduction time, the former being set to about 750 msec and the latter to about 500 msec in the ratio of three to two. As another alternative, the fade-out reproduction time and fade-in reproduction time may be determined on a discretionary basis.

According to the first embodiment discussed above, when a given play list PL is to be set or not set for reproduction of its music data items D1, each of a plurality of music data items D1 registered in that play list PL was shown faded in and out for normal reproduction over the constant time CT. Alternatively, where a given play list PL is to be set or not set to reproduce its music data items D1, each of the registered music data items D1 in the play list PL may be faded in and out for normal reproduction over a constant time CT that is varied depending on the number of the music data items D1 in that play list PL (i.e., the number of the music data items set to be reproduced, the number of the music data items not set to be reproduced, or the sum of these two numbers; the time CT may illustratively be made shorter the larger the music data item count involved).

Furthermore, when allowing a given play list PL to be set or not set for reproducing its music data items D1, the reproducing apparatus 10 may reproduce the play list PL by jumping from one music data item to another, with a predetermined number of music data items skipped in between depending on the number of the registered music data items D1 in the play list PL (i.e., the number of the music data items set to be reproduced, the number of the music data items not set to be reproduced, or the sum of these two numbers; the number of the items to be skipped may illustratively be made larger the greater the music data item count involved). Thus when allowing the user to set or not set a given play list PL for reproduction of its music data items D1, the reproducing apparatus 10 enables the user intuitively to have a rough estimate of the number of the registered music data items D1 in that play list PL. The rough number of the music data items D1 serves as a rule of thumb by which to determine whether to use the play list PL in question for music data reproduction. The rough music data item count may also be referenced in the future when the content of the play list PL in question is desired to be reorganized.

According to the first embodiment described above, when a given play list PL is to be set or not set for reproduction of its music data items D1, the registered music data items in that play list PL are faded in and out one after another for normal reproduction over the constant time CT. Alternatively, when the user selects a given play list PL by resorting to the corresponding channel during activation of the list-using reproduction function, the multiple registered music data items D1 in that play list PL may be faded in and out one after another for normal reproduction over the constant time CT. In this manner, the reproducing apparatus 10 may let the user continuously listen to part of each of the multiple registered music data items D1 in the play list PL, without the user making operations to change music data items. This makes it easy for the user to search for desired music data items D1.

Also according to the first embodiment discussed above, when the user operates the input unit 12 in a relatively quick manner, the fade-out and fade-in reproduction times are controlled in accordance with the intervals at which the reproduced music change instruction is input. Alternatively, the fade-out and fade-in reproduction times may be varied depending on the time zone of the day (e.g., morning, daytime, evening, nighttime, at dead of night) in which the music data items D1 are reproduced from the play list PL. Illustratively, the earlier the time zone (i.e., morning), the shorter the fade-out and fade-in reproduction time; the later the time zone (i.e., at dead of night), the longer the fade-out and fade-in reproduction times.

Also according to the first embodiment discussed above, when the input unit 12 is operated by the user relatively quickly, the fade-out and fade-in reproduction times are controlled in keeping with the intervals at which the reproduced music change instruction is input. Alternatively, the fade-out and fade-in time may be varied depending on the length of the time in which an operation key of the input unit 12 is held down. Illustratively, the fade-out and fade-in reproduction times may be made shorter the longer the time in which an operation key of the input unit 12 is kept pushed. As another alternative, the reproducing apparatus 10 may be arranged in such a manner that the longer the time in which the operation key is held down to shorten the fade-out and fade-in reproduction times, the larger the number of music data items to be skipped between two music data items reproduced consecutively from the play list PL having a plurality of music data items D1 registered therein.

Also according to the above-described first embodiment, upon relatively quick operation of the input unit 12 by the user, the fade-out and fade-in reproduction times are controlled in keeping with the intervals at which the reproduced music change instruction is input as repeated above. Alternatively, the fade-out and fade-in reproduction times may be controlled as follows: illustratively, when channels are to be changed, the fade-out and fade-in reproduction times may be rendered relatively short; when music data items D1 are to be changed, the fade-out and fade-in reproduction times may be made longer than those in effect upon channel change (or vice versa).

Also according to the first embodiment described above, with the reproduction screen 40 displayed on the display unit 18 under control of the display processing unit 17, the user's request to change channels or music data items D1 (i.e., input of a channel change instruction or a reproduced music change instruction) brings about transition from the reproduction screen 40 to the selection screen 20 on the display unit 18. Alternatively, with the reproduction screen 40 displayed on the display unit 18 under control of the display processing unit 17, at the user's request to change channels or music data items D1 (i.e., upon input of a channel change instruction or a reproduced music change instruction), the reproduction screen 40 may be left displayed on the display unit 18 while the content of the screen 40 is updated (i.e., the current display information 50 is replaced by the next display information 51).

Also according to the first embodiment explained above, if a given music data item D1 being reproduced starting from its specific position is definitively selected as the preferred music data item (i.e., if the music selection finalizing instruction is input), or if a given music data item D1 is fully reproduced to its ending position, then the selection screen 20 is replaced by the reproduction screen 40 on the display unit 18. Alternatively, upon elapse of a predetermined time on a given music data item D1 being reproduced starting from its specific position (i.e., the time interval being shorter than the time of reproduction between the specific position and the ending position), the current display information 50 may be left intact on the display unit 18 while the selection screen 20 is replaced by the reproduction screen 40.

(2) Second Embodiment

Figure 26:
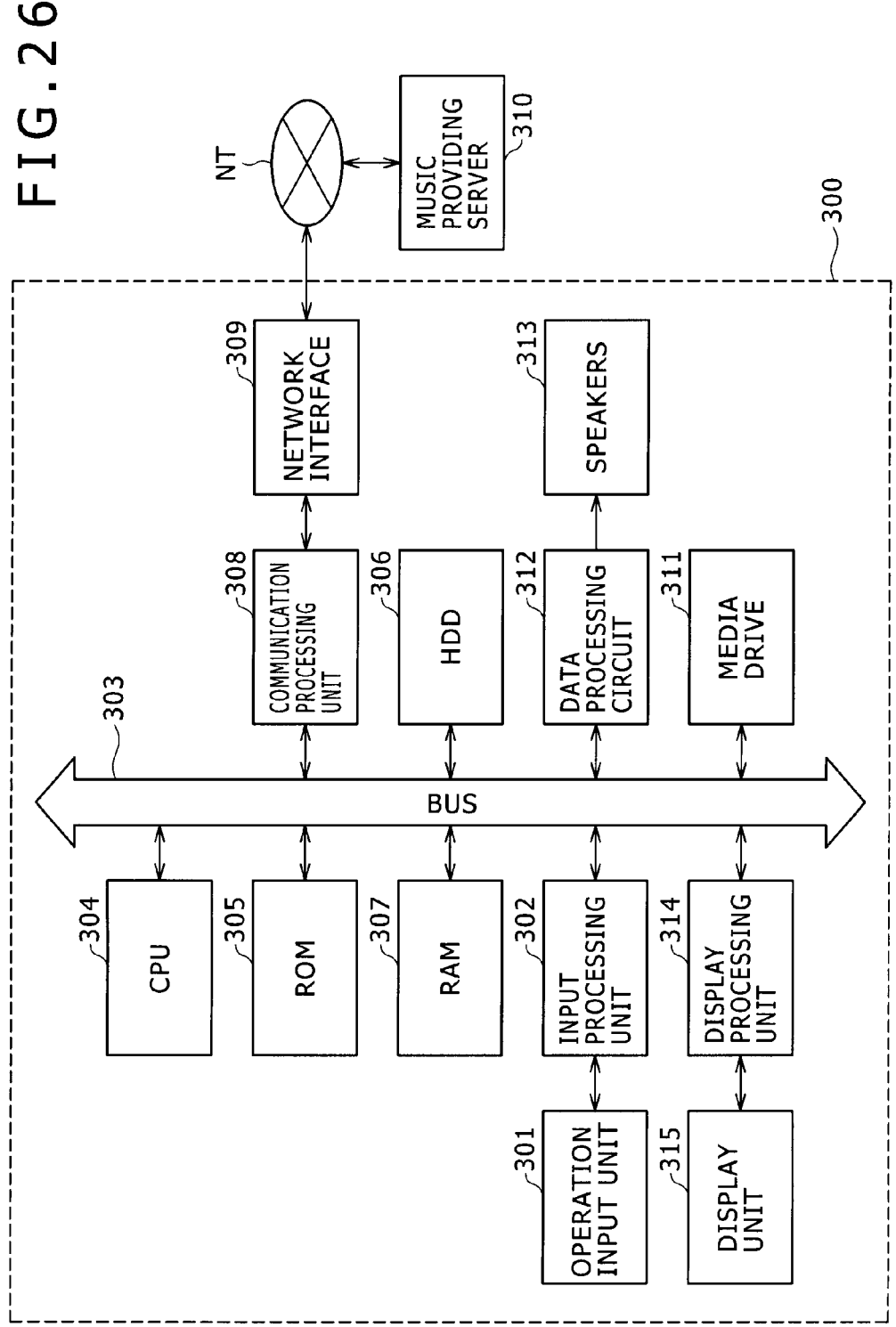
FIG. 26 is a block diagram showing a typical structure of a reproducing apparatus practiced as a second embodiment of the present invention.

FIG. 26 is a block diagram showing a hardware circuit structure of hardware circuit blocks in a reproducing apparatus 300 practiced as the second embodiment of the present invention. The reproducing apparatus 300 has an operation input unit 301 made up of various operation buttons furnished on the surface of the apparatus enclosure or on a remote controller (not shown). An operation carried out by the user is recognized by the operation input unit 301 which in turn outputs an operation input signal reflecting the user's operation to an input processing unit 302. The input processing unit 302 performs a predetermined process on the supplied operation input signal for conversion into an operation command. The operation command thus acquired is sent to a CPU (central processing unit) 304 over a bus 303.

The CPU 304 reads previously stored various programs such as a basic program and application programs from a ROM (read only memory) 305 or from a hard disk drive 306 over the bus 303 into a RAM (random access memory) 307. Using the programs loaded into the RAM 307, the CPU 304 controls the apparatus 300 as a whole and performs diverse processes in response to the operation commands supplied from the input processing unit 302.

The CPU 304 may connect to a network NT through a communication processing unit 308 and a network interface 309, in that order, for access to a music providing server 310 on the network NT. In this setup, the music providing server 310 holds large numbers of music data items in various formats.

The user may operate the operation input unit 301 to input an operation input signal for requesting download of a desired music data item. In that case, the CPU 304 gains access to the music providing server 310 and requests download of the designated music data item. In turn, the CPU 304 downloads the designated music data item returned by the music providing server 310, the data item being sent through the network interface 309 and communication processing unit 308, in that order. The CPU 304 outputs the downloaded music data item to the hard disk drive 306 for storage thereon.

The user may further operate the operation input unit 301 to input an operation input signal for recording music data items retrieved from a recording medium such as CD. In such a case, the CPU 304 reads the music data items from the recording medium loaded in a media drive 311 and forwards the retrieved music data items to a data processing circuit 312. The data processing circuit 312 encodes through compression the music data items coming from the media drive 311 and sends the encoded data items to the hard disk drive 306 for storage on its hard disk.

The user may also operate the operation input unit 301 to designate a music data item on the hard disk drive 306 and to input an operation input signal for requesting reproduction of the designated music data item. In that case, the CPU 304 reads the designated music data item from the hard disk drive 306 and forwards the retrieved data item to the data processing circuit 312. In turn, the data processing circuit 312 decodes the supplied music data item and performs such audio-related processes as digital-to-analog conversion and amplification on the decoded data item. The resulting music signal is fed to speakers 313. The CPU 304 then causes the speakers 313 to output music based on the supplied music signal for the user's enjoyment.

The hard disk drive 306 stores a plurality of play lists on its hard disk. If the user operates the operation input unit 301 to designate a given play list for music data reproduction and if the user inputs an operation input signal for requesting reproduction of the music data items according to the play list, then the CPU 304 reads the designated play list from the hard disk drive 306 and reads multiple registered music data items one after another according to the retrieved play list from the hard disk drive 306. The retrieved music data items are forwarded successively to the data processing unit 312. Every time a music data item is fed from the CPU 304, the data processing circuit 312 decodes the supplied music item and performs such audio-related processes as digital-to-analog conversion and amplification on the decoded data item. The resulting music signal is fed to the speakers 313. In this manner, the CPU 304 causes the speakers 313 continuously to output music based on the consecutively supplied music signals, so that the user may enjoy a plurality of songs in uninterrupted fashion.

Furthermore, the CPU 304 creates display data reflecting the results of execution of diverse programs (e.g., acquisition, recording, and reproduction of music data items) and sends the created data to a display processing unit 314. In turn, the display processing unit 314 causes a display unit 315 to display screens based on the display data supplied from the CPU 304. In this manner, the CPU 304 allows the user visually to verify various screens on the display unit 315 concerning the acquisition, recording, reproduction, etc., of music data items.

In the reproducing apparatus 300, the CPU 304 basically performs various processes and controls hardware functions in keeping with the programs read from the ROM 305 or from the hard disk drive 306 as described above. In that setup, the reproducing apparatus 300 may have its CPU 304 operate in the same manner as the above-described control unit 11 (FIG. 2) using appropriate programs selected from the ROM 305 or hard disk drive 306 in a manner reflecting the functions of the reproducing apparatus 10 constituted by the functional circuit blocks shown in FIG. 2 as the hardware structure. Similarly, the reproducing apparatus 300 may get the media drive 311, data processing circuit 312, and speakers 313 to function in the same manner as the above-described reproduction unit 13 (FIG. 2) and have the operation input unit 301 and input processing unit 302 operate in the same manner as the input unit 12 (FIG. 2) discussed above. Furthermore, the reproducing apparatus 300 may get the hard disk drive 306 to function in the same manner as the above-described content data storage unit 14 (FIG. 2) and have the communication processing unit 308 and network interface 309 operate in the same manner as the communication unit 15 (FIG. 2) discussed above.

In addition, the reproducing apparatus 300 may have the display processing unit 314 and the display unit 315 functionally mirror the above-described display processing unit 17 (FIG. 2) and the display unit 18 (FIG. 2) above, respectively. The music providing server 310 may be considered to correspond to the external apparatus 16 (FIG. 2) mentioned above. In a setup involving the music providing server 310, the reproducing apparatus 300 may carry out the same processes as the above-described reproducing apparatus 10 using appropriate programs selected from the ROM 305 or hard disk drive 306 in a manner reflecting the functions of the reproducing apparatus 10. By functioning as outlined above, the reproducing apparatus 300 offers the same effects as those of the above-described first embodiment of this invention.

(3) Other Embodiments

The first and the second embodiments were shown to utilize as their content data the music data items discussed above in reference to FIGS. 1 through 26. Alternatively, many other kinds of content data may be used extensively, including broadcast data constituting TV and radio programs and image data making up movies.

The first and the second embodiments were shown to adopt the reproduced music change instruction, channel change instruction, and music selection finalizing instruction discussed above with reference to FIGS. 1 through 26 as the instructions concerning content data reproduction. Alternatively, it is possible to adopt many other reproduction-related instructions extensively, including an instruction to finalize the selection of a given play list PL.

According to the first and the second embodiments above, the present invention is practiced as the reproducing apparatuses 1, 10, and 300 discussed above in reference to FIGS. 1 through 26. Alternatively, the invention may be practiced in the form of may other types of reproducing apparatuses, such as information processing apparatuses including personal computers, mobile phones, and PDA (personal digital assistant); reproducing apparatuses including portable or stationary music players; and recording and reproducing apparatuses including DVD (digital versatile disc) recorders and hard disk recorders.

As described above, the present invention may be practiced advantageously as reproducing apparatuses such as music players capable of continuously reproducing a plurality of music data items.

It should be understood by those skilled in the art that various modifications, combinations, sub-combinations and alterations may occur depending on design requirements and other factor in so far as they are within the scope of the appended claims or the equivalents thereof.

What is claimed is:

1. A reproducing apparatus for continuously reading and reproducing a plurality of content data items comprising:
   a content data storage unit which stores said plurality of content data items, each of the plurality of content data items including an audio segment and specific position information that specifies a predetermined portion of the content data item that does not include a beginning of the content data item, and each of the specific position information being retrieved from an external storage device via a network and associated with the plurality of content data items;
   an input unit;
   a reproduction unit configured to reproduce said content data items; and
   a control unit configured to cause said reproduction unit to start a current reproduction of the audio segment of a first content data item from said plurality of content data items at the predetermined portion specified by the specific position information of said first content data item when a first predetermined instruction is input through said input unit instructing said reproduction unit to operate in a reproduction limited mode, said control unit being further configured to cause said reproduction unit to end said reproduction limited mode and start reproducing a second content data item from said plurality of content data items from a beginning position of the audio segment of said second content data item when the current reproduction of the audio segment of said first content data item is terminated, wherein
   each of said plurality of content data items is a song and each audio segment is determined prior to a reproduction of any content data item from said plurality of content data items by the reproducing apparatus,
   said control unit selects one of a plurality of play lists defining sequences in which to reproduce said plurality of content data items, and causes said reproduction unit to reproduce said plurality of said content data items successively in accordance with the selected play list, when a second predetermined instruction is input through said input unit,
   said control unit selects a new play list from said plurality of play lists and causes said reproduction unit to start reproducing the audio segments of the content data items registered in the newly selected play list at the predetermined portions specified by the specific position information of said content data items of the newly selected play list when a third predetermined instruction is input through said input unit during the successive reproduction of content data items of the previously selected play list,
   said control unit sets at least either a fade-out reproduction time or a fade-in reproduction time based on a number of content data items registered in the newly selected play list, said fade-out reproduction time being a time period over which a content data item registered in the newly selected play list is faded out, said fade-in reproduction time being a time period over which a content data item registered in the newly selected play list is faded in,
   said control unit causes said reproduction unit to fade out a current content data item registered in the newly selected play list and fade in a next content data item registered in the newly selected play list in accordance with at least either said fade-out reproduction time or said fade-in reproduction time when the current content data item is to be changed, and
   said control unit sets at least either said fade-in reproduction time or said fade-out reproduction time to be shorter than a predetermined time period when the number of content data items registered in said newly selected play list is smaller than a predetermined value.

2. The reproducing apparatus according to claim 1, wherein said control unit causes said reproduction unit to stop reproducing the audio segment of said first content data item and start reproducing the audio segment of said second content data item at the predetermined portion specified by the specific position information of said second content data item when a second predetermined instruction is input through said input unit during the current reproduction of said first content data item.

3. The reproducing apparatus according to claim 1, wherein said control unit causes said reproduction unit to fade out the audio segment of said first content data item when said first content data item is to be changed.

4. The reproducing apparatus according to claim 3, wherein said control unit causes said reproduction unit to fade in the audio segment of said second content data item, when said first content data item is to be changed.

5. The reproducing apparatus according to claim 4, further comprising:
   a display processing unit configured to display information about said first content data item on a display unit,
   wherein before the audio segment of said second content data item is faded in, said control unit causes said display processing unit to start displaying information about said second content data item on said display unit.

6. The reproducing apparatus according to claim 4, wherein said control unit controls said reproduction unit to fade out the audio segment of said first content data item over a longer time period than when controlling said reproduction unit to fade in the audio segment of said second content data item.

7. The reproducing apparatus according to claim 1, wherein said control unit causes said reproduction unit to end said reproduction limited mode and start reproducing said first content data item from a beginning position of said first content data item when a second predetermined instruction, instructing the reproduction unit to end said reproduction limited mode, is input through said input unit during the current reproduction of said first content data item.

8. The reproducing apparatus according to claim 1, wherein said first content data item included in a first playlist that defines a sequence in which to reproduce the audio segment of said first content data item at the predetermined portion specified by the specific position information of said first content data item when a second predetermined instruction to reproduce the first playlist is input through the input unit.

9. The reproducing apparatus according to claim 1, wherein said first content data item is included in a first play list that defines a sequence in which to reproduce the audio segment of said first content data item at the predetermined portion specified by the specific position information of said first content data item, and the control unit causes the reproduction unit to start reproducing the audio segment of another content data item included in a second play list that defines a second sequence in which to reproduce the audio segment of said another content data item at the predetermined portion specified by the specific position information of said another content data item when a second predetermined instruction to reproduce the second play list is input through the input unit.

10. The reproducing apparatus according to claim 1, wherein said plurality of content data items is determined independently of the reproducing apparatus, and
   the content data storage unit stores each content data item in association with the corresponding specific position information.

11. The reproducing apparatus according to claim 1, wherein each predetermined portion specified by the respective specific position information corresponds to a melodic portion of a musical structure of the respective content data item.

12. The reproducing apparatus according to claim 11, wherein the melodic portion of the musical structure is a chorus of the respective content data item.

13. A non-transitory computer readable storage medium having instructions stored therein, which when executed by a processor in a reproducing apparatus causes the processor to execute a method comprising:
   storing a plurality of content data items, each of said plurality of content data items including an audio segment and specific position information that specifies a predetermined portion of the content data item that does not include a beginning of the content data item, and each of the specific position information being retrieved from an external storage device via a network and associated with said plurality of content data items;
   starting a current reproduction of the audio segment of a first content data item from said plurality of content data items at the predetermined portion specified by the specific position information of said first content data item when a first predetermined instruction is input instructing the processor to operate in a reproduction limited mode;
   terminating the reproduction limited mode and starting reproduction of the audio segment of a second content data item from said plurality of content data items from a beginning position of the audio segment of said second content data item when the current reproduction of said first content data item is terminated;
   selecting one of a plurality of play lists defining sequences in which to reproduce said plurality of content data items and reproducing said plurality of said content data items successively in accordance with the selected play list when a second predetermined instruction is input; and
   selecting a new play list from said plurality of play lists and reproducing the audio segments of the content data items registered in the newly selected play list at the predetermined portions specified by the specific position information of said content data items of the newly selected play list when a third predetermined instruction is input during the successive reproduction of content data items of the previously selected play list, wherein
   each of said plurality of content data items is a song and each audio segment is determined prior to a reproduction of any content data item from said plurality of content data items by the processor,
   at least either a fade-out reproduction time or a fade-in reproduction time based on a number of content data items registered in the newly selected play list is set, said fade-out reproduction time being a time period over which a content data item registered in the newly selected play list is faded out, said fade-in reproduction time being a time period over which a content data item registered in the newly selected play list is faded-in,
   a current content data item registered in the newly selected play list is faded out and a next content data item registered in the newly selected play list is faded-in in accordance with at least either said fade-out reproduction time or said fade-in reproduction time when the current content data item is to be changed, and
   at least either said fade-in reproduction time or said fade-out reproduction time is set to be shorter than a predetermined time period when the number of content data items registered in said newly selected play list is smaller than a predetermined value.

14. A reproducing method, implemented on a reproducing apparatus, the method comprising:
   storing a plurality of content data items, each of said plurality of content data items including an audio segment and specific position information that specifies a predetermined portion of the content data item that does not include a beginning of the content data item, and each of the specific position information being retrieved from an external storage device via a network and associated with said plurality of content data items;
   starting a current reproduction of the audio segment of a first content data item from said plurality of content data items at the predetermined portion specified by the specific position information of said first content data item when a first predetermined instruction is input instructing said reproducing apparatus to operate in a reproduction limited mode;
   terminating said reproduction limited mode and starting reproduction of the audio segment of a second content data item from said plurality of content data items from a beginning position of the audio segment of said second content data item when the current reproduction of said first content data item is terminated;
   selecting one of a plurality of play lists defining sequences in which to reproduce said plurality of content data items and reproducing said plurality of said content data items successively in accordance with the selected play list when a second predetermined instruction is input; and
   selecting a new play list from said plurality of play lists and reproducing the audio segments of the content data items registered in the newly selected play list at the predetermined portions specified by the specific position information of said content data items of the newly selected play list when a third predetermined instruction is input during the successive reproduction of content data items of the previously selected play list, wherein
   each of said plurality of content data items is a song and each audio segment is determined prior to a reproduction of any content data item from said plurality of content data items by the reproducing apparatus,
   at least either a fade-out reproduction time or a fade-in reproduction time based on a number of content data items registered in the newly selected play list is set, said fade-out reproduction time being a time period over which a content data item registered in the newly selected play list is faded out, said fade-in reproduction time being a time period over which a content data item registered in the newly selected play list is faded-in,
   a current content data item registered in the newly selected play list is faded out and a next content data item registered in the newly selected play list is faded-in in accordance with at least either said fade-out reproduction time or said fade-in reproduction time when the current content data item is to be changed, and at least either said fade-in reproduction time or said fade-out reproduction time is set to be shorter than a predetermined time period when the number of content data items registered in said newly selected play list is smaller than a predetermined value.

15. A reproducing apparatus for continuously reading and reproducing a plurality of content data items comprising:

content data storing means for storing said plurality of content data items, each of said plurality of content data items including an audio segment and specific position information that specifies a predetermined portion of the content data item that does not include a beginning of the content data item, and each of the specific position information being retrieved from an external storage device via a network and associated with the plurality of content data items;

inputting means;

reproducing means for reproducing said content data items; and controlling means for causing said reproducing means to start a current reproduction of the audio segment of a first content data item from said plurality of content data items at the predetermined portion specified by the specific position information of said first content data item when a predetermined instruction is input through said inputting means instructing said reproducing means to operate in a reproduction limited mode, said controlling means further causing said reproducing means to end said reproducing limited mode and start reproducing a second content data item from said plurality of content data items from a beginning position of the audio segment of said second content data item when the current reproduction of said first content data item is terminated, wherein each of said plurality of content data items is a song and each audio segment is determined prior to a reproduction of any content data item from said plurality of content data items by the reproducing apparatus, said controlling means selects one of a plurality of play lists defining sequences in which to reproduce said plurality of content data items, and causes said reproduction unit to reproduce said plurality of said content data items successively in accordance with the selected play list, when a second predetermined instruction is input through said inputting means, said controlling means selects a new play list from said plurality of play lists and causes said reproduction unit to start reproducing the audio segments of the content data items registered in the newly selected play list at the predetermined portions specified by the specific position information of said content data items of the newly selected play list when a third predetermined instruction is input through said inputting means during the successive reproduction of content data items of the previously selected play list, said controlling means sets at least either a fade-out reproduction time or a fade-in reproduction time based on a number of content data items registered in the newly selected play list, said fade-out reproduction time being a time period over which a content data item registered in the newly selected play list is faded out, said fade-in reproduction time being a time period over which a content data item registered in the newly selected play list is faded in, said controlling means causes said reproduction unit to fade out a current content data item registered in the newly selected play list and fade in a next content data item registered in the newly selected play list in accordance with at least either said fade-out reproduction time or said fade-in reproduction time when the current content data item is to be changed, and said controlling means sets at least either said fade-in reproduction time or said fade-out reproduction time to be shorter than a predetermined time period when the number of content data items registered in said newly selected play list is smaller than a predetermined value.

* * * * *